United States Patent
Ohshita et al.

(10) Patent No.: US 6,666,005 B1
(45) Date of Patent: Dec. 23, 2003

(54) PACKAGING METHOD AND PACKAGING APPARATUS

(75) Inventors: Minoru Ohshita, Kurita-gun (JP); Toshio Oguri, Kurita-gun (JP); Norio Kawanishi, Kurita-gun (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/743,505

(22) PCT Filed: May 10, 2000

(86) PCT No.: PCT/JP00/03021
§ 371 (c)(1),
(2), (4) Date: Jan. 11, 2001

(87) PCT Pub. No.: WO00/69725
PCT Pub. Date: Nov. 23, 2000

(30) Foreign Application Priority Data

May 18, 1999 (JP) .............................. 11-137025
Apr. 14, 2000 (JP) ...................... 2000-113549

(51) Int. Cl.⁷ .............................................. B65B 61/10
(52) U.S. Cl. .................... 53/478; 53/392.2; 53/329.3; 53/329.5; 53/388; 53/488
(58) Field of Search .................. 53/478, 488, 485, 53/329.5, 329.3, 329.2, 329.4, 334, 338

(56) References Cited

U.S. PATENT DOCUMENTS

| | | | | |
|---|---|---|---|---|
| 3,383,256 A | * | 5/1968 | Carbone | 53/329.3 |
| 3,416,292 A | * | 12/1968 | Weber | 53/329.4 |
| 3,508,376 A | * | 4/1970 | Bemiss | 53/478 |
| 3,706,175 A | * | 12/1972 | Anderson | 53/478 |
| 4,162,599 A | * | 7/1979 | Kyle | 53/511 |
| 4,180,959 A | * | 1/1980 | Hempel et al. | 53/334 |
| 4,870,800 A | * | 10/1989 | Kasai | 53/329.3 |
| 5,243,808 A | * | 9/1993 | Landrum | 53/484 |
| 5,447,736 A | * | 9/1995 | Gorlich | 53/329.5 |
| 5,606,847 A | * | 3/1997 | Joensson et al. | 53/478 |
| 5,718,101 A | * | 2/1998 | Noel et al. | 53/329.5 |
| 6,050,055 A | * | 4/2000 | Calvert et al. | 53/329.3 |

FOREIGN PATENT DOCUMENTS

| | | |
|---|---|---|
| JP | 36-14389 B1 | 8/1961 |
| JP | 110002 A | 7/1982 |
| JP | 1-130901 A | 9/1989 |
| JP | 7-285522 A | 10/1995 |

* cited by examiner

*Primary Examiner*—Rinaldi I. Rada
*Assistant Examiner*—Thanh Truong
(74) *Attorney, Agent, or Firm*—Shinjyu Global IP Counselors, LLP

(57) ABSTRACT

The invention provide an apparatus that can seal with film an article placed on a tray without having to change tooling for each shape and size of tray.

Packaging apparatus 1 covers opening o with film Fm and thermally welds film Fm to flange f. Tray T is provided with flange f and opening o surrounded by flange f on its upper face. The apparatus is provided with roller 3 and roller swivel mechanism 8. Roller 3 can touch against film Fm on a portion of flange f. The touched surface of roller 3 is at an angle with respect to a horizontal plane. Roller swivel mechanism 8 moves roller 3 in a swiveling manner.

21 Claims, 24 Drawing Sheets

PACKAGING METHOD AND PACKAGING APPARATUS

TECHNICAL FIELD

The present invention relates to a packaging method and packaging apparatus. More particularly, the present invention relates to a packaging method and packaging apparatus wherein a tray, having a flange and an opening surrounded by said flange on its upper face and containing an article to be packaged, is covered with a film over the opening and the film is welded to the flange.

BACKGROUND ART

Conventionally fresh fish and meat, as well as side dishes and other processed foods, have been packaged using the "overlap method." The overlap method involves putting the food product into a tray and wrapping the entire tray with a film.

Consequently, the planar size of the film must be several times larger than the planar size of the tray because both the tray and the entire food product must be covered and the ends of the film must overlap in order to form a seal. Furthermore, such packages are often sealed by pressing a hot plate against the overlapped ends of the film on the bottom of the tray, which results in an inferior seal.

Meanwhile, there are some cases where another method (hereinafter called the "top-seal method") is used instead of the overlap method. With the top-seal method, the film is placed only over the opening provided in the upper face of the tray and the film is thermally welded to the tray along the periphery of the hole. Using the top-seal method can reduce film consumption by half in comparison with the overlap method.

The top-seal method has been used chiefly for packaging shimeji and other varieties of mushroom. One common form of the top-seal method is to apply an adhesive to the sides of the tray around the opening and bond the ends of the film to the tray when the film is placed over the opening. Another common form is to sandwich the tray and a piece of film that is larger than the planar size of the tray between two tools and apply pressure and heat to thermally weld the film to the tray.

The disadvantage with both of these top-seal methods is that they require tooling matched to the size and shape of the tray. Consequently, industries that need to use multiple tray types to package a variety of different articles often use the overlap method instead of the top-seal method. Although the top-seal method provides such merits as reduced film consumption and improved sealing characteristics, it is often impractical because a separate set of tools must be prepared for each different size and shape of tray.

DISCLOSURE OF INVENTION

The object of the present invention is to provide a packaging method and corresponding packaging apparatus that allow an article placed on a tray to be sealed with a film using the top-seal method but do not require the preparation of tooling for each different size and shape of tray.

A packaging method in accordance with the first aspect of the invention is provided with first, second, third, and fourth steps. In the first step, the article to be packaged is put on a tray having an opening in its upper face; in the second step, the opening in the tray is covered with a film; in the third step, a heated hot member is touched, in a direction intersecting with a vertical direction, against the film on a portion of the tray near the opening where the film touches; and in the fourth step, at least one of the hot member or the tray is moved.

More specifically, in the first step of the packaging method described in the first aspect, a food product or other article is placed on a tray. In the second step, the opening in the upper face of the tray is covered with a film so that the film is touching a portion of the periphery of the tray opening. In the third step, the film on a portion of the tray near the opening where the film touches is pressed with a heated hot member in a direction intersecting with a vertical direction. In other words, the hot member is applied at an angle to a portion of the tray near the opening. In the fourth step, at least one of the hot member or the tray is moved while the hot member being applied at an angle to a portion of the tray near the opening. As a result, the entire portion of the film that is touching the tray in the area surrounding the opening is thermally welded to the tray.

With this method, since at least one of the hot member or the tray is moved, the hot member and the periphery of the tray opening are moved relative to each other. Consequently, various shapes and sizes of tray can be accommodated so long as the size of the tray is within certain limits. Unlike conventional top-seal methods, it is not necessary to prepare tools for each different type of tray or to spend time changing those tools each time a different tray is used. Therefore, equipment costs can be reduced and the efficiency of packaging operations can be improved.

Also, since the hot member is applied to a portion of the tray near the opening from a direction that intersects with a vertical direction, the hot member only comes in contact with a portion of the tray near the opening and does not come in contact with the portion of the film covering the tray opening. Consequently, the portion of the film that covers the opening is less likely to melt or develop tiny holes.

It is preferred that a pressure applying mechanism and controller be provided so that the pressure at which the hot member is applied to a portion of the tray near the opening and the speed at which the hot member and the periphery of the tray opening are moved relative to each other can be set to levels that are well matched to the materials from which the tray and film are made. It is also preferred that a controller and an angle adjustment mechanism be provided so that the degree to which the heating means heats the hot member and the angle at which the hot member is touched against the portion of the tray near the opening can be adjusted as necessary and appropriate.

A packaging method in accordance with the second aspect of the invention is a method as recited in the first aspect, wherein, either one or two or more hot members are touched against the film on a portion of the tray near the opening in the third step and either one or two or more hot members move along the periphery of the opening in the tray in the fourth step.

By touching two or more hot members against a portion of the tray near the opening, the amount by which each hot member must be moved along the periphery of the tray opening can be reduced in comparison with amount of movement required when only one hot member is used. That is, when only one hot member is used, the hot member must be moved at least one full revolution around the tray opening in order to weld the film to the entire periphery of the tray opening. But, when two or more hot members are used, the film can be welded to the entire periphery of the tray opening without moving each hot member a full revolution around the tray opening. Thus, the time required to move in the fourth step can be reduced and the efficiency of the packaging process can be improved.

Conversely, costs can be reduced when only one hot member is applied to a portion of the tray near the opening because, although the hot member must be moved at least one full revolution around the tray opening in order to weld the film to the entire periphery of the tray opening, fewer hot members need to be prepared.

A packaging method in accordance with the third aspect of the invention is a method as recited in the first or second aspect, wherein, during the third and fourth steps, the hot member not only thermally welds the film to a portion of the tray near the opening but also cuts the outer portion of the thermally welded film.

This method improves the efficiency of the packaging process because the film is welded and cut simultaneously.

It is also feasible to thermally cut the outer portion of the thermally welded film by using the hot member that welds the film to the tray. The hot member can thermally cut the film more reliably if a tensile force is applied to the film.

A packaging method in accordance with the fourth aspect of the invention is a method as recited in any one of the first through third aspects, wherein, during the fourth step, the hot member rolls as it moves along the periphery of the opening in the tray.

With this method, the frictional resistance between the hot member and the film on the tray is reduced because the hot member rolls on the tray (i.e., the hot member rotates as it moves along the tray). As a result, the film is less likely to melt or develop tiny holes.

Also, it is preferable for the face of the hot member that contacts the film to be made of a resilient material (such as resin or synthetic rubber) so that firm contact can be maintained between the film and the tray even when small irregularities exist on the surface of the tray.

A packaging method in accordance with the fifth aspect of the invention is a method as recited in any one of the first through fourth aspects, wherein, during the fourth step, the hot member is moved along the periphery of the opening in the tray by swiveling the hot member about a swivel shaft while planarly moving the swivel shaft.

A packaging method in accordance with the sixth aspect of the invention is a method as recited in any one of the first through fifth aspects of the invention. In the third step, a plurality of the hot members is touched against the periphery of the opening in the tray from above the stretch film. In the fourth step, the hot members are moved along the periphery of the opening in the tray by swiveling the plurality of hot members about the axes of at least two swivel shafts disposed in different planar positions.

A packaging apparatus in accordance with the seventh aspect of the invention is an apparatus, wherein a tray, provided with a flange and an opening surrounded by said flange on its upper face and containing an article to be packaged, is covered with a film over the opening and the film is welded to the flange. The packaging apparatus is provided with a hot member and a moving means. The hot member is capable of touching against the film on a portion of the flange of the tray, and the face of the hot member is capable of touching the tray is at an angle with respect to a horizontal plane. The moving means moves at least one of the hot member or the tray.

With the packaging apparatus described in the seventh aspect of the invention, the film is thermally welded to the flange by touching the hot member against the film on a portion of the flange of the tray. Then, when the hot member and the tray are moved relative to each other by the moving means, the hot member touches all portions of the flange and the film is thermally welded to the entire flange.

With this apparatus, since the hot member touches a portion of the flange and at least one of the hot members or the tray is moved, various shapes and sizes of tray can be accommodated so long as the size of the tray is within certain limits. Unlike conventional top-seal methods, it is not necessary to prepare tools for each different type of tray or to spend time changing those tools each time a different tray is used. Therefore, equipment costs can be reduced and the efficiency of packaging operations can be improved.

Also, since the face of the hot member is capable of touching the tray is at an angle with respect to a horizontal plane, the hot member only comes in contact with the flange of the tray and does not come in contact with the portion of the film covering a opening surrounded by the flange. Consequently, the portion of the film that covers the opening is less likely to melt or develop tiny holes.

A packaging apparatus in accordance with the eighth aspect of the invention is an apparatus as recited in the seventh aspect, wherein, the moving means moves the hot member against the tray.

A packaging apparatus in accordance with the ninth aspect of the invention is an apparatus as recited in the eighth aspect, wherein the moving means is provided with a swivel mechanism and a moving swivel shaft mechanism. The swivel mechanism swivels the hot member about a swivel shaft. The moving swivel shaft mechanism planarly moves the swivel shaft of the swivel mechanism.

With this apparatus, the swivel mechanism and the moving swivel shaft mechanism move the hot member. The moving swivel shaft mechanism can remain still when packaging trays with circular planar shapes or it can be operated when packaging trays with a large length-to-width ratio (or large rectangular trays). When the moving swivel shaft mechanism is used to move the swivel shaft while the hot member is being swiveled, shapes (and sizes) of tray that the hot member cannot follow using swiveling alone can be accommodated. That is, by combining movement of the swivel shaft with swiveling, the hot member can be moved along the entire flange of the tray.

Furthermore, when packaging trays having a large length-to-width ratio, the amount of time the hot member touches each part of the flange of the tray can be made more uniform by operating the moving swivel shaft mechanism. For odd-shaped trays as well, sealing can be accomplished by moving the swivel mechanism in both the X and Y directions.

Thus, since the apparatus described in this claim is provided with a moving swivel shaft mechanism, it can accommodate both odd-shaped trays and trays whose planar shape is rectangular or otherwise characterized by a large length-to-width ratio better than an apparatus that merely swivels the hot member around a fixed shaft.

A packaging apparatus in accordance with the tenth aspect of the invention is an apparatus as recited in the ninth aspect which is further provided with a controller. The controller controls at least one of the speed at which the hot member is swiveled by the swivel mechanism or the speed at which the swivel shaft is moved by the moving swivel shaft mechanism.

Since the packaging apparatus described in the ninth aspect is configured so that the hot member is moved along the flange by swiveling the hot member, the amount of time the hot member touches each part of the flange will vary if a constant swivel speed is used on any tray that is not circular in shape. This variance results in the occurrence of pinholes and defective sealing (i.e., failure to achieve a seal) in the seal area. In order to reduce this variance, this claim calls for controlling the speed at which the swivel mechanism swivels the hot member. Thus, the variance in the amount of time the hot member contacts each part of the tray can be reduced.

A packaging apparatus in accordance with the eleventh aspect of the invention is an apparatus as recited in the eight aspect, wherein a plurality of said hot members are provided. The swivel mechanism has at least two swivel shafts disposed in different planar positions. The swivel mechanism moves the plurality of hot members by swiveling at least one of the hot members about a first swivel shaft and swiveling at least one of the hot members about a second swivel shaft.

With this apparatus, the swivel mechanism is provided with multiple swivel shafts; a hot member swivels about a first swivel shaft while a hot member also swivels about a second swivel shaft. Since the positions of the first and second swivel shafts are planarly separated, the area over which the hot members can be moved is the total of the swivel areas of both swivel shafts. Therefore, even if the tray has a large length-to-width ratio, the hot members can be moved so that entire flange is accommodated by separating the two swivel shafts in the lengthwise direction of the rectangle. Furthermore, when packaging trays having a large length-to-width ratio, the amount of time hot members touch each part of the flange can be made more uniform.

Thus, since the swivel mechanism of the apparatus described in claim 11 is provided with multiple swivel shafts and swivels a hot member around each swivel shaft, it can accommodate trays whose planar shape is rectangular or otherwise characterized by a large length-to-width ratio better than an apparatus that merely swivels a hot member around a single fixed swivel shaft.

It is also feasible to control the apparatus so that it uses only one of the multiple swivel shafts and the hot member that swivels around that swivel shaft to conduct thermal welding on trays whose planar shape is circular (or otherwise has a length-to-width ratio close to 1).

A packaging apparatus in accordance with the twelfth aspect of the invention is an apparatus as recited in the eleventh aspect, which is further provided with a moving swivel shaft mechanism. The moving swivel shaft mechanism planarly moves at least one of swivel shafts.

With this apparatus, in addition to providing the swivel mechanism with multiple swivel shafts, the apparatus is configured so that the moving swivel shaft mechanism can move the swivel shafts planarly. Consequently, the apparatus can accommodate trays having even larger length-to-width ratios (or large rectangular trays). Furthermore, the amount of time the rollers touch each part of the flange can be made more uniform by precisely controlling the movement of the swivel shafts.

A packaging apparatus in accordance with the thirteenth aspect of the invention is an apparatus as recited in the twelfth aspect, which is further provided with a controller. The controller controls at least one of the speed at which the hot member is swiveled by the swivel mechanism or the speed at which the swivel shaft is moved by the moving swivel shaft mechanism.

A packaging apparatus in accordance with the fourteenth aspect of the invention is an apparatus as recited in the seventh aspect, wherein, the moving means moves the tray against the hot member.

A packaging apparatus in accordance with the fifteenth aspect of the invention is an apparatus as recited in any one of the seventh through fourteenth aspects, which is further provided with a film feeding means, a lift mechanism, and a hot member moving mechanism. The film feeding means feeds the film between the tray and the hot member. The lift mechanism lifts the tray and presses the flange of the tray against the film. The hot member moving mechanism moves the hot member and presses it against the film at a portion of the flange of the tray, which has been lifted by said lift mechanism.

With this apparatus, when a food product or other article is placed in a tray is lifted by the lift mechanism, the film has been fed between the tray and the hot member presses against the flange of the tray. When the hot member moving mechanism moves the hot member, the hot member is pressed against the film on a portion of the flange. Then, when the hot member and the tray are moved relative to each other by the moving means, the film is thermally welded to each portion of the flange.

A packaging apparatus in accordance with the sixteenth aspect of the invention is an apparatus as recited in any one of the seventh through fifteenth aspects, wherein a plurality of said hot members are provided. Hot members are so arranged that each hot member can touch a different portion of the flange of the tray.

Since multiple hot members are provided, the amount by which each hot member must be moved along the flange of the tray can be reduced in comparison with amount of movement required when only one hot member is provided. That is, when only one hot member is provided, the hot member must be moved at least one full revolution around the flange of the tray in order to weld the film to the entire flange of the tray. However, since this apparatus is provided with multiple hot members, the film can be welded to the entire flange of the tray without moving each hot member a full revolution around the flange.

Thus, the time required for the hot member moving means to move the hot members can be reduced and the efficiency of the packaging process can be improved.

A packaging apparatus in accordance with the seventeenth aspect of the invention is an apparatus as recited in any one of the seventh through sixteenth aspects, which is further provided with a controller. The controller controls the moving means to move at least one of the tray or the hot member so that the film is thermally cut at the outside of the thermally welded portion while being thermally welded to the tray.

With this apparatus, the hot member that thermally welds the film to the tray is used to thermally cut the outer portion of the thermally welded film. The film covers the tray and remains continuously connected to the film feeding means after the film is thermally cut. Therefore, the film feeding means can feed the film more smoothly and the film can be taken up more smoothly after cutting if a take-up means is provided which takes up the film that remains after the film is thermally cut.

Furthermore, the hot member can thermally cut the film more reliably if a tensile force is applied to the film.

A packaging apparatus in accordance with the eighteenth aspect of the invention is an apparatus as recited in any one of the seventh through seventeenth aspects, wherein, the hot member is a heat-emitting roller and rolls on the flange of the tray while the tray and the hot member are moving relative to each other.

With this apparatus, the hot member (heat-emitting roller) rolls on the flange of the tray. That is, the hot member rotates as it moves over the flange. Therefore, the frictional resistance between the hot member and the film on the flange and the film is less likely to tear or develop tiny holes.

Also, it is preferable for the face of the hot member that contacts the film to be made of a resilient material (such as resin or synthetic rubber) so that firm contact can be maintained between the film and the flange even when small irregularities exist on the surface of the flange of the tray.

A packaging apparatus in accordance with the nineteenth aspect of the invention is an apparatus as recited in any one of the seventh through eighteenth aspects, wherein, the part of the hot member that touches the periphery of the opening in the tray is made of an elastomer containing silicon or fluoro rubber.

It is preferable for the face of the hot member that contacts the film to be made of a resilient elastic material so that firm contact can be maintained between the film and the tray even when small irregularities exist on the surface of the tray.

Therefore, with the apparatus described in claim 19, the part of the hot member that touches the flange of the tray is made of an elastomer containing silicon or fluoro rubber. The use of such an elastomer can also make it more difficult for the hot member to damage the surface of the tray as it rolls on the tray. Furthermore, an elastomer containing silicon or fluoro rubber is highly durable and therefore less susceptible to heat deterioration. Such elastomers also provide good heat conduction and improve efficiency, and they reduce damage to the film because of their superior surface release property.

Also, since the part of the hot member that touches the flange of the tray is made of an elastomer containing silicon or fluoro rubber, friction between a roller and the film to be necessary for rotation of the roller is improved if the hot member is the roller.

MODES FOR CARRYING OUT THE INVENTION

First Embodiment

<Summary of the Apparatus>

Figure 1:
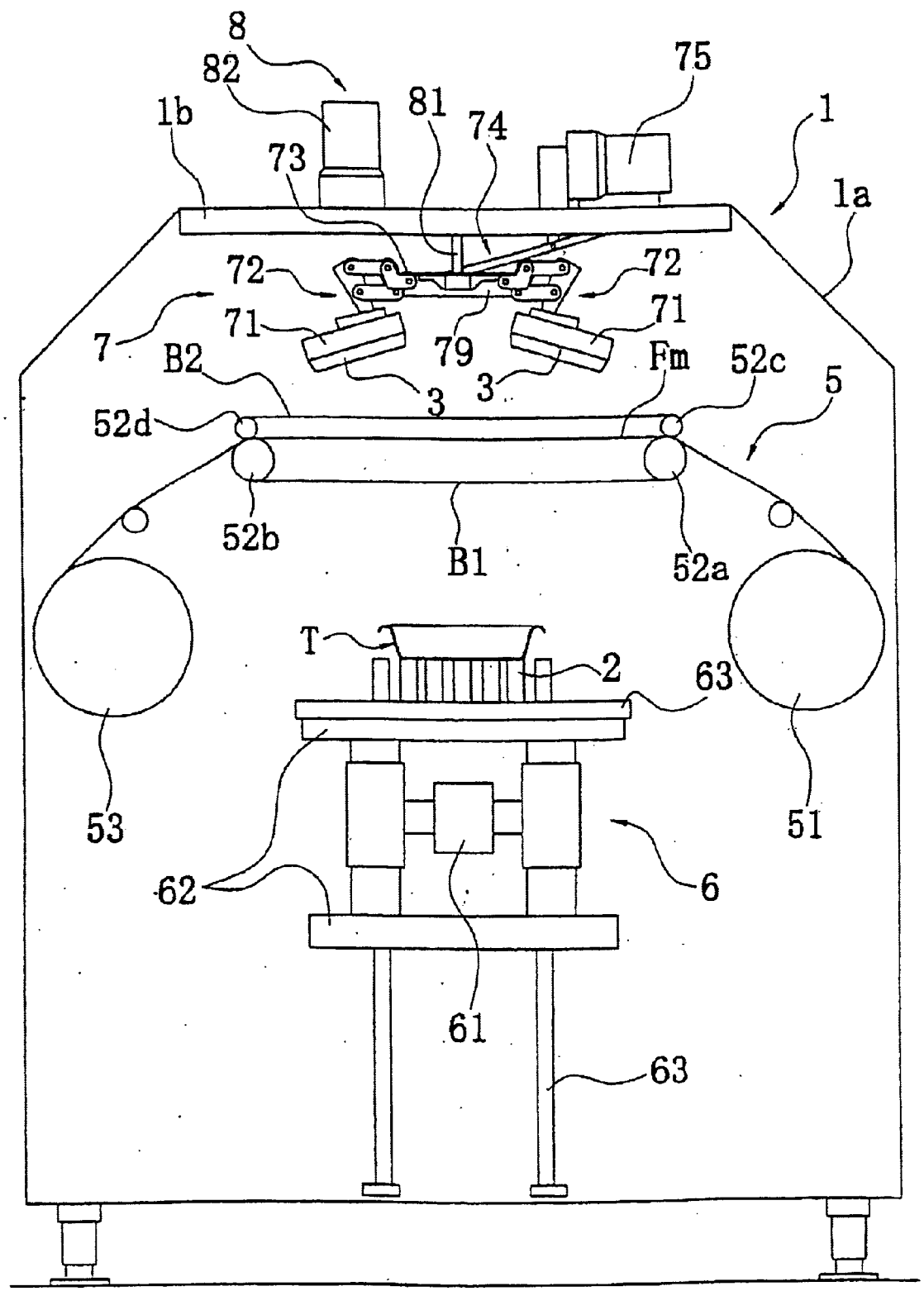
FIG. 1 is a schematic view of the packaging apparatus in the first embodiment.

First embodiment of a packaging apparatus in accordance with the present invention is shown in FIG. 1. The packaging apparatus 1 shown in the figure is a so-called top-seal type packaging apparatus wherein the opening o on the upper portion of a tray T containing meat, fish, or other perishable food product is covered with a film Fm (see FIG. 6) and sealed by thermally welding film Fm to flange f, which is disposed around the periphery of opening o in tray T.

<Constitution of the Apparatus>

Packaging apparatus 1 comprises chiefly the following components: a frame 1a; a holding member 2, which holds tray T; four rollers 3 positioned above holding member 2; a film feeding mechanism 5, which feeds film Fm between holding member 2 and rollers 3; a lift mechanism 6, which raises and lowers holding member 2; a roller moving mechanism 7, which moves rollers 3 chiefly up and down; a roller swivel mechanism 8, which swivels rollers 3; and a controller (not shown), which controls the mechanisms.

<Detailed Descriptions of the Components>

(Holding Member)

Holding member 2 holds tray T on its upper surface and is raised and lowered by lift mechanism 6. Tray T may be placed on holding member 2 either manually by an operator or automatically by a separate transport apparatus.

(Rollers)

Figure 4:
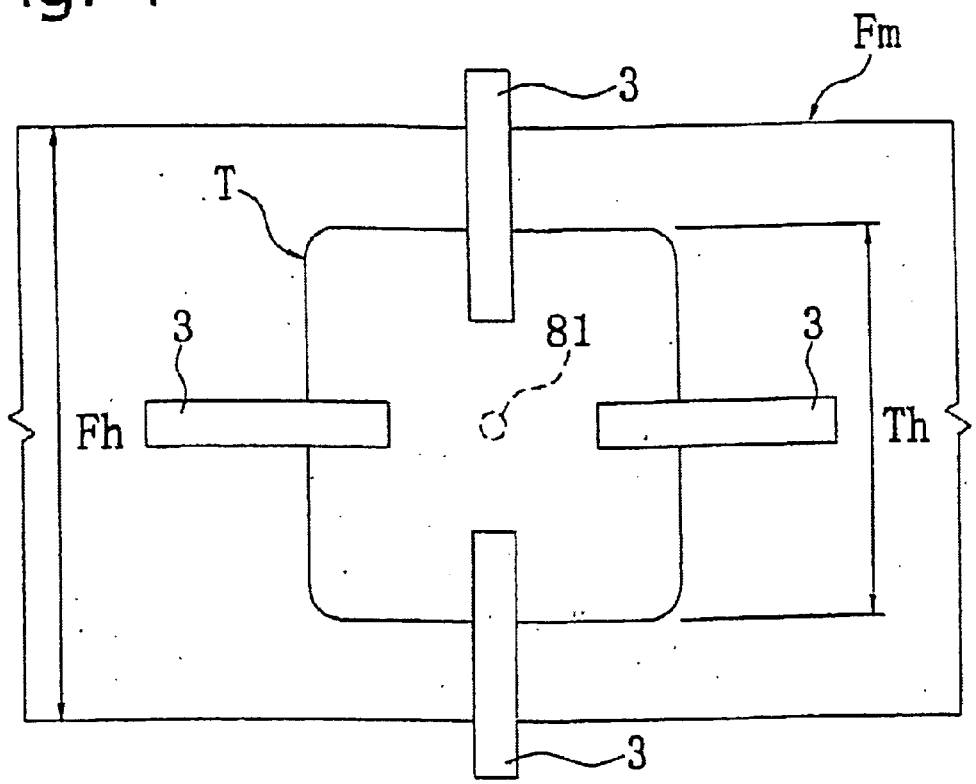
FIG. 4 is a plan view showing the arrangement of the tray and film in the first embodiment.

Each roller 3 comprises a cylindrical member that is axially supported by roller support 71 of roller moving mechanism 7 (discussed later) so that the roller can rotate freely. The surface of roller 3 is provided with a layer that is softer than other parts of the roller in order to reduce the frictional resistance between the roller and film Fm. More particularly, the surface of roller 3 is made of a resilient material, such as resin or synthetic rubber, so that firm contact can be maintained between film Fm and flange f even when small irregularities exist on the surface of flange f of tray T. Also, since friction between roller 3 and film Fm is improved, roller 3 rolls surely and film Fm is sealed without occurrence of pinholes and other detective things. As shown in FIG. 4, four rollers 3 are arranged radially with respect to shaft 81 of roller swivel mechanism 8 (discussed later). As shown in FIG. 1, rollers 3 are supported by roller supports 71 in such a manner that, when viewed from the side, they form an angle with respect to the horizontal plane containing the upper face of tray T. The angle is set so that the end of each roller 3 that is closer to shaft 81 is higher than the other end.

Inside each roller 3 is a heating element (not shown) for heating the roller 3. Appropriate specifications for the heating element are selected based on the materials from which the tray T and film Fm are made and the necessity of supplying energy that can quickly replenish the heat lost during the sealing operation.

(Film Feeding Mechanism)

Film feeding mechanism 5 delivers an amount of film Fm that is appropriate for the size of tray T to the space between lowered holding member 2 and rollers 3. Film feeding mechanism 5 comprises a delivery section 51 which holds the supply of film Fm, a transport section which transports film Fm and is capable of clamping film Fm, and a take-up section 53 which takes up the film Fm remaining after a portion has been cut away to package tray T. Delivery section 51, the transport section, and take-up section 53 are each supported by frame 1a. The transport section comprises: transport rollers 52a, 52b disposed on opposite sides of the space between holding member 2 and rollers 3; presser rollers 52c, 52d that press against the transport rollers; two belts B1 that traverse transport rollers 52a, 52b; and two belts B2 that traverse presser rollers 52c, 52d. With this particular film feeding mechanism 5, the film Fm held by delivery section 51 is transported by belts B1 traversing transport rollers 52a, 52b and the two belts B2 traversing presser rollers 52c, 52d and connects with take-up section 53. Transport rollers 52a, 52b and take-up section 53 are operated using a motor or other driving means (not shown).

The controller can instruct the transport section to adjust the amount of film it carries in order to accommodate the size of tray T. The data used to change the feed amount can be provided to the controller by manually entering the size of tray T in advance or by using a measuring device to detect the size tray T.

The two belts B1 traversing transport rollers 52a, 52b and the two belts B2 traversing presser rollers 52c, 52d can move freely in a direction roughly perpendicular to the direction in which film Fm is fed (the film moves from left to right in FIG. 1). When lift mechanism 6 (discussed later) raises tray T, these belts apply tension to film Fm, making it possible to achieve a smooth film surface with no wrinkles over opening o in tray T.

Also, it is feasible to expand the width of film Fm by applying traverse tension to film Fm. Thus a variety of tray sizes can be accommodated.

Also, reliability of cutting film Fm is improved if these belts apply tension to film Fm after sealing.

Furthermore, by changing the amount of film Fm that the transport system carries between transport rollers 52a, 52b, a variety of tray sizes can be accommodated with a single size of film.

Belts B1, which transport film Fm, are made of a material that grips onto film Fm and are structured so that the film can be sandwiched between belts B1 and the belts B2 traversing presser roller 52c, 52d.

(Lift Mechanism)

Lift mechanism 6 is a mechanism for lifting tray T against film Fm and comprises: a drive motor 61; stationary section 62, which is affixed to frame 1a; and moving section 63, which moves up and down with respect to stationary section 62. Holding member 2 is affixed to the upper face of moving section 63. Thus, a tray T placed on holding member 2 is raised and lowered according to the movement of moving section 63.

Drive motor 61 is a servomotor or a stepper motor, and its speed is controlled electronically by the controller. Since the movement of moving section 63 is controlled electronically, this embodiment allows the speed curve, stroke, and other aspects of the movement to be set relatively easily, thus making it possible to raise and lower tray T under the conditions best suited to the size of tray T and the article being packaged. Additionally, mechanisms and control methods other than the electronic control described above can also be used to move moving section 63. Such mechanisms and control methods include mechanical control using cams and crank mechanisms and pneumatic control using air cylinders and the like.

(Roller Moving Mechanism)

Figure 9:
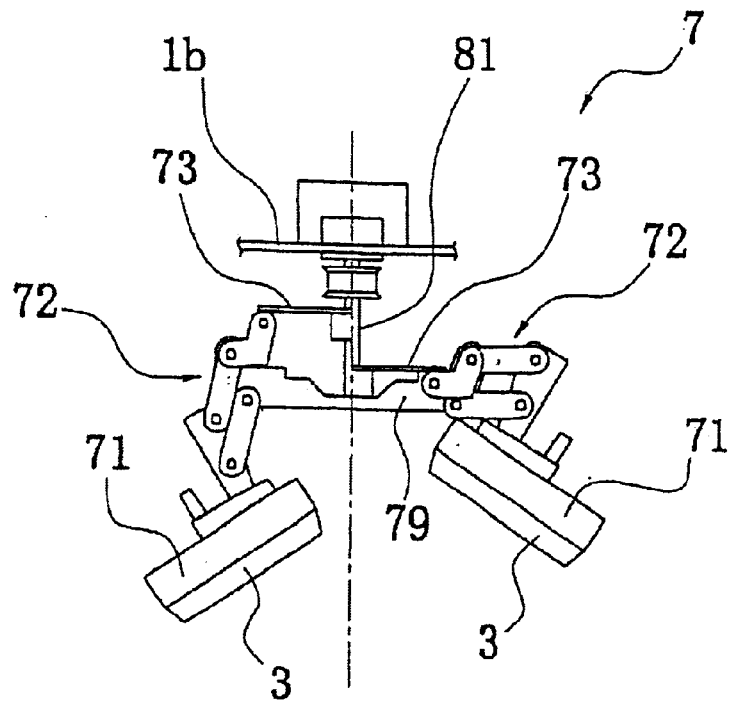
FIG. 9 is an operation of the roller moving mechanism in the first embodiment.

Roller moving mechanism 7 is a mechanism for changing the vertical position of rollers 3 and, as shown in FIGS. 1 and 9, comprises: roller supports 71, which axially support rollers 3; link mechanism 72; presser plate 73; lever mechanism 74, which applies a force to the upper side of presser plate 73; and motor 75, which operates lever mechanism 74.

Roller supports 71 axially support rollers 3 in such a manner that rollers 3 are angled as shown in FIG. 1 when viewed from the side. One end of link mechanism 72 supports roller support 71 with a pin and the other end is pressed downward by presser plate 73. When the other end of link mechanism 72 is pressed down by presser plate 73, the one end is raised as shown on the right side of FIG. 9. As a result, roller support 71 and roller 3 are also brought to a raised position. Meanwhile, when presser plate 73 no longer applies a force to link mechanism 72, the opposite end of link mechanism 72 moves down due to the weight of roller supports 71 and rollers 3 (see left side of FIG. 9).

Presser plate 73 is a disk shaped member that can move freely up and down along shaft 81 of roller swivel mechanism 8 (discussed later). The force that moves presser plate 73 downward is provided from above by lever mechanism 74, which is driven by motor 75. The outer edge of presser plate 73 rests on the other end of link mechanism 72 (see FIG. 9).

(Roller Swivel Mechanism)

Roller swivel mechanism 8 swivels rollers 3, as well as the roller supports 71 and link mechanisms 72 that support them, through a prescribed angle when the package is being sealed and comprises shaft 81 and motor 82, which rotates shaft 81. The lower end of shaft 81 is fixed to base 79, which supports link mechanism 72, and the upper end of shaft 81 is connected to motor 82 via a timing belt and pulley (not shown).

Figure 5:
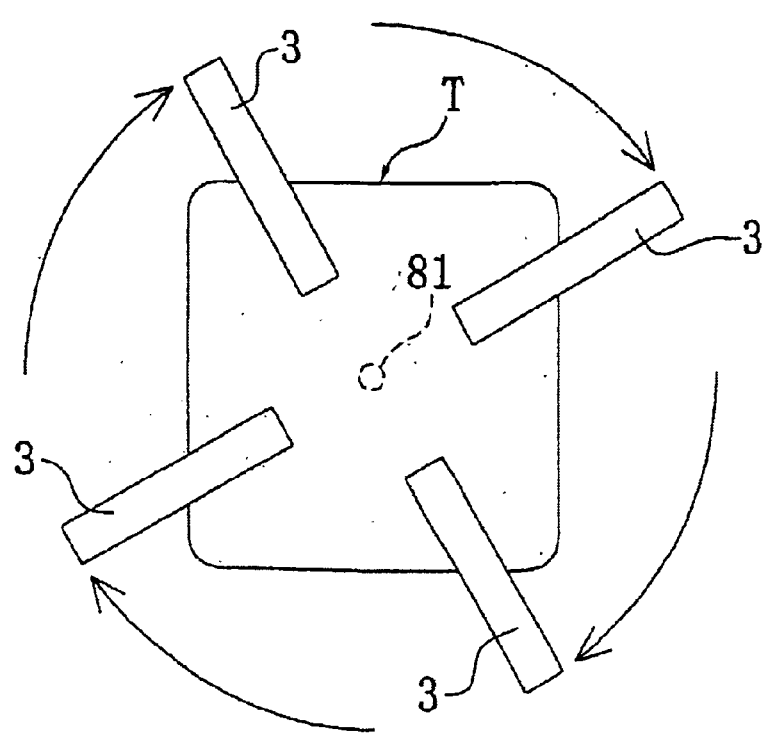
FIG. 5 is a rotational motion of rollers in the first embodiment.

When motor 82 responds to instructions from the controller and rotates shaft 81 over a prescribed angle, rollers 3 swivel about shaft 81 over the prescribed angle (see FIG. 5).

<Control Operations of the Apparatus>

When a tray T is loaded onto holding member 2 as shown in FIG. 1, the controller first calculates the amount of film Fm to be fed by film feeding mechanism 5 based on the size of tray T that was detected by a measuring device or provided via manual input.

When the film feeding mechanism 5 has fed the calculated amount of film Fm, the transport section moves the two belts B1 that traverse transport rollers 52*a*, 52*b* and the two belts B2 that traverse presser rollers 52*c*, 52*d* in a direction perpendicular to the transport direction (horizontal direction in FIG. 4). This movement of the belts stretches film Fm in the traverse direction (vertical direction in FIG. 4), thus tensioning film Fm in the traverse direction.

Figure 2:
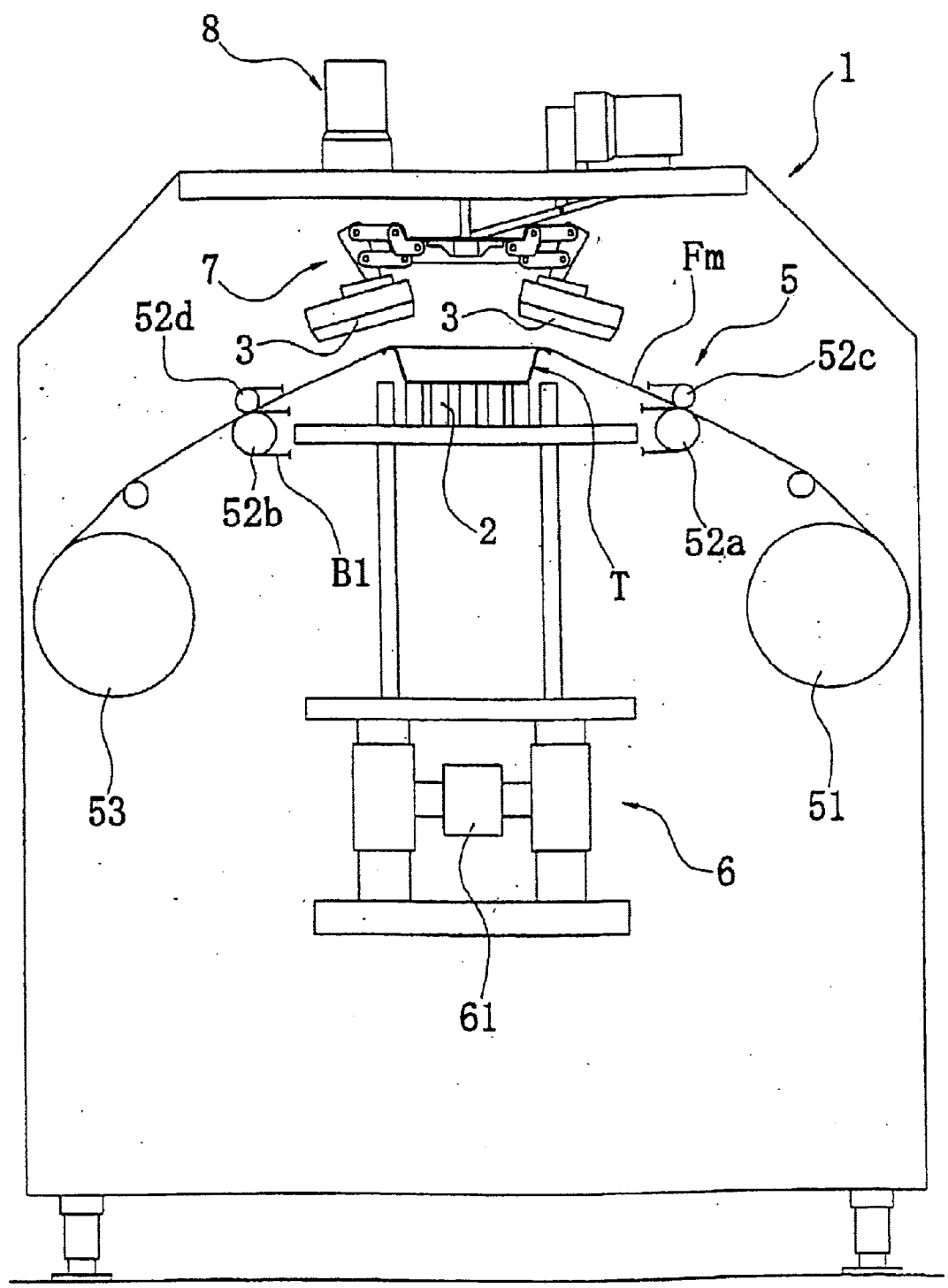
FIG. 2 is one state of the packaging apparatus in the first embodiment.

Lift mechanism 6 then lifts moving section 63 by the amount calculated by the controller based on the size of tray T; tray T pushes film Fm upward and stops (see FIG. 2). The upward pressure of tray T tensions film Fm in the transport direction.

Figure 3:
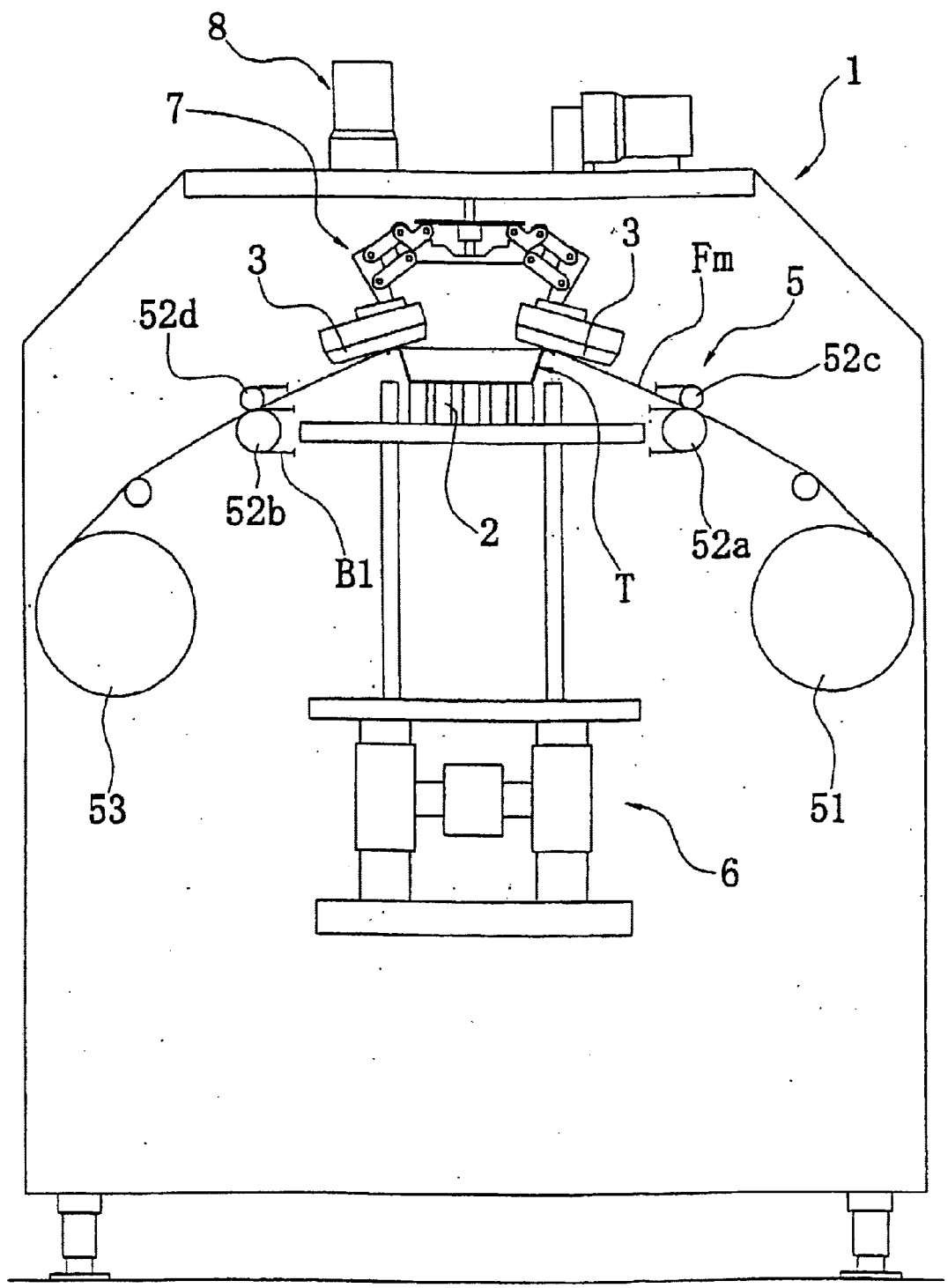
FIG. 3 is one state of the packaging apparatus in the first embodiment.

Next the controller controls motor 75 so as to release the downward force lever mechanism 74 applies to presser plate 73, thus releasing link mechanism 72. As a result, rollers 3 move into contact with tray T due to their own weight (see FIG. 3). Since rollers 3 are independent of one another, each roller 3 contacts tray T with roughly the same pressure.

While simultaneously controlling motor 75 so that rollers 3 contact tray T, the controller instructs motor 82 to rotate shaft 81 through a prescribed angle. Since four rollers 3 are provided at an even spacing with respect to the rotational direction (see FIG. 4), a prescribed angle of 90° would be sufficient for rollers 3 to seal the entire periphery of tray T. However, in this embodiment, a slightly larger angle of 100° is used. When shaft 81 turns and rollers 3 begin to rotate (see FIG. 5), rollers 3 follow along the periphery (flange f) of tray T and thermally weld film Fm to tray T, thus forming a seal. Here, rollers 3 roll on flange f as they move.

Figure 6:
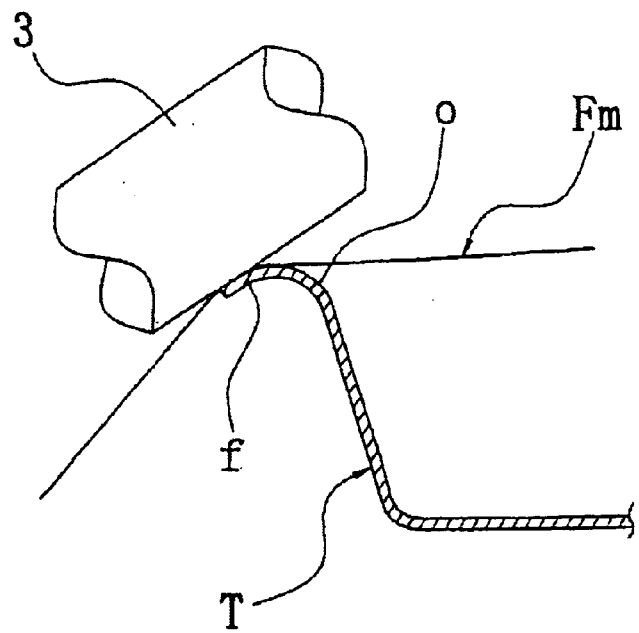
FIG. 6 is an enlarged view of the flange area when a roller contacts the tray in the first embodiment.

FIG. 6 shows an enlarged view of the contact area between rollers 3 and tray T when the former move along the periphery of the latter. The opening o in tray T is covered by film Fm, which is tensioned in both the longitudinal and traverse directions, and film Fm is pressed against flange f of tray T. Rollers 3 touch diagonally against the portion where film Fm contacts flange f and apply both heat and pressure. This heat and pressure causes film Fm and flange f to thermally fuse together. At the same time, film Fm melts and is cut away at the edge portion (which is, in this case, the apex of flange f where rollers 3 are touching) of tray T because the heat and pressure are concentrated on film Fm at the edge portion of tray T (see FIG. 7).

After rollers 3 have finished sealing film Fm to tray T, rollers 3 are raised and lift mechanism 6 lowers tray T. Then the sealed tray T is removed from holding member 2 and the next cycle begins. When the next cycle begins, film Fm, of which a portion has been thermally cut away in the process of sealing tray T, is taken up by driving take-up section 53. The width Fh of film Fm is set to be wider than the width Th of tray T (see FIG. 4); the continuity of film Fm is not severed as a result of sealing tray T and trouble wherein it becomes impossible for take-up section 53 to take up the film does not occur.

<Features of the Apparatus>

(1)

Figure 8:
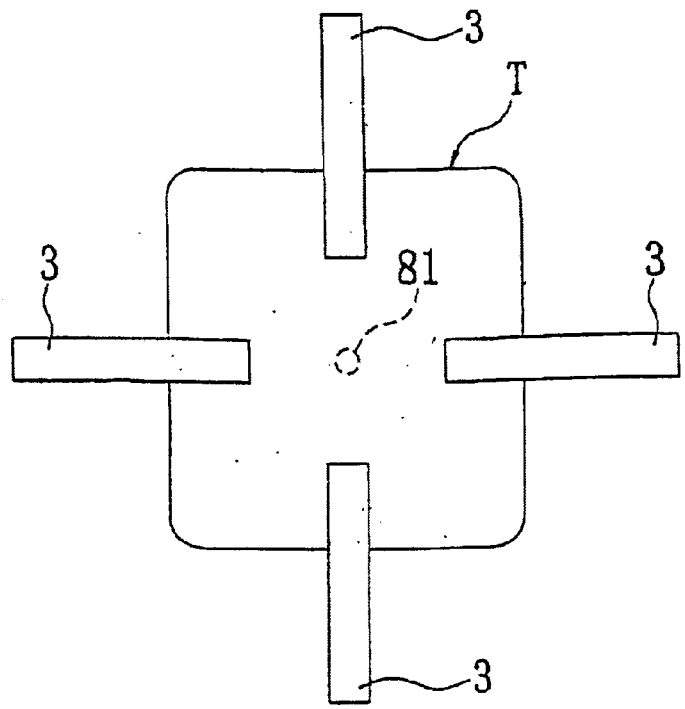
FIG. 8 illustrates a plan view of the tray shapes that the apparatus can accommodate in the first embodiment.
Figure 8:
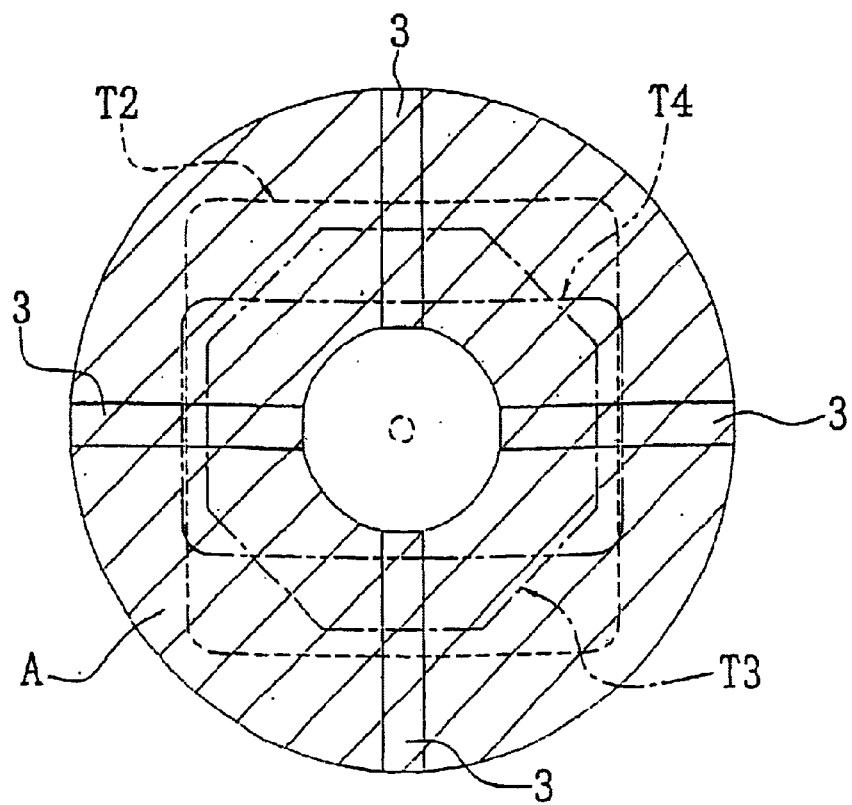

With this apparatus 1, each roller 3 contacts tray T independently and is made to roll while touching the upper surface of flange f of tray T. Therefore, unless it has an unusual shape, tray T can be packaged and sealed regardless of its shape or size. FIG. 8(*b*) provides a plan view of the area in which apparatus 1 can execute the sealing operation; the area is indicated as shaded area A (doughnut shaped area). Thus, the apparatus is not limited to the size and shape of tray T shown in FIG. 8(*a*) but rather can seal any of the trays shown in FIG. 8(*b*)—namely, the large tray T2 indicated with a dotted line, the octagonal tray T3 indicated with a single-dotted chain line, and the rectangular tray T4 indicated with a double-dotted chain line—or any other shape and size of tray T that can fit with in area A.

Therefore, even in industries requiring a variety of different trays, apparatus 1 can provide efficient sealing without tools and other components having to be changed. It also promotes the conservation of resources by reducing the amount of film used and improves the safety of food products by providing a completely sealed package.

(2)

With this apparatus 1, rollers 3 contact only the portion of film Fm that is on flange f and do not touch the portion of film Fm covering opening o in tray T (see FIGS. 6 and 7) because rollers 3 are applied to flange f at an angle (slanted with respect to a horizontal plane). As a result, the portion of film Fm covering opening o is less likely to melt or develop tiny holes.

(3)

With this apparatus, the pressure applied to flange f of tray T during thermal welding can be adjusted by changing the slant angle of rollers 3. The scaling time can also be adjusted by controlling the rotation of motor 82 so as to change the speed and speed curve of shaft 81. By combining temperature control of the heating elements that heat rollers 3 with the ability to adjust the pressure and sealing time, sealing conditions that are well matched to tray T and film Fm can be established.

(4)

With this apparatus 1, tension is applied to film Fm in the traverse direction by moving the two belts B1 traversing transport rollers 52*a*, 52*b* and the two belts B2 traversing presser rollers 52*c*, 52*d* and tension is applied to film Fm in the transport direction by lifting tray T. Since film Fm is tensioned when it is sealed to tray T, the problem of wrinkles existing in film Fm after sealing tray T is almost eliminated.

Figure 7:
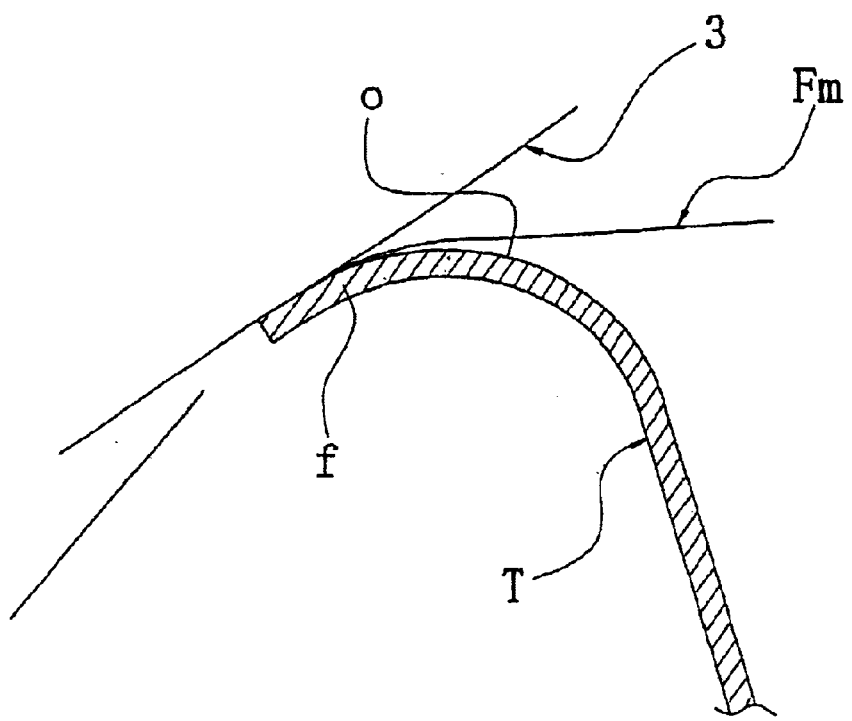
FIG. 7 is an enlarged view of the flange area when the film is thermally welded to the tray in the first embodiment.

Also, since the sealing is conducted while film Fm is under tension, the thermal cutting of the outer portion of the thermally welded film Fm is more easily accomplished. As shown in FIG. 7, rollers 3 thermally cut film Fm in a reliable manner.

(5)

With this apparatus 1, it is easy to recycle the trays because the top-seal method adopted uses thermal welding instead of an adhesive.

A Variation on the First Embodiment (A)

Figure 10:
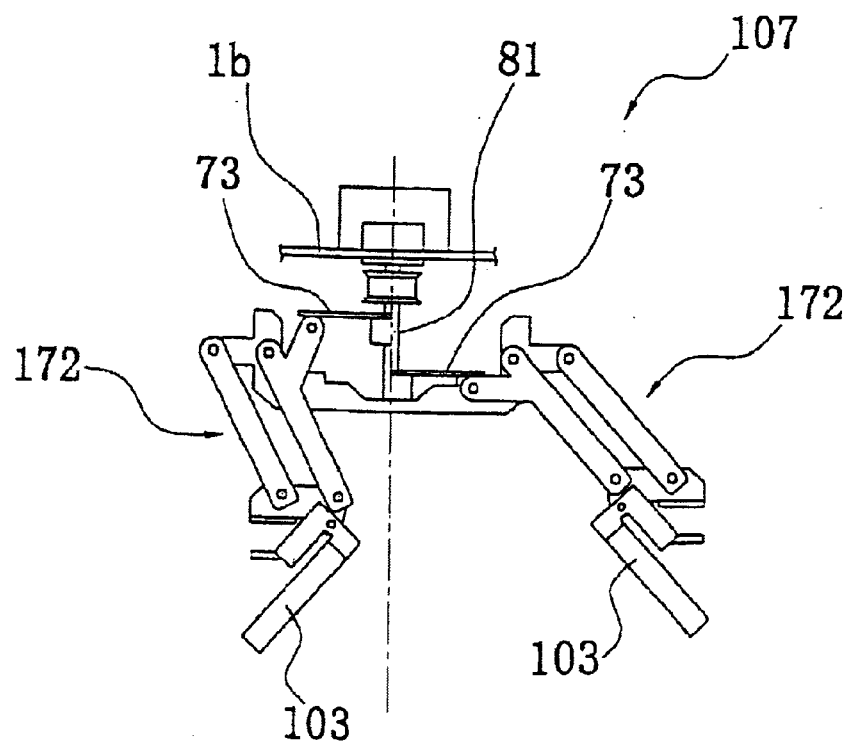
FIG. 10 is an operation of the roller moving mechanism in a variation on the first embodiment.

While the first embodiment uses a roller moving mechanism 7 like the one shown in FIG. 9 to move rollers 3 chiefly downward with respect to tray T in order to establish contact, it is also acceptable to use a roller moving mechanism 107 like the one shown in FIG. 10, which moves rollers 3 chiefly horizontally with respect to tray T in order to establish contact.

The apparatus shown in FIG. 10 is provided with link mechanism 172 instead of link mechanism 72 of roller moving mechanism 7 and with rollers 103 instead of rollers 3. When presser plate 73 is pushed downward, rollers 103 move horizontally away from shaft 81, as shown on the right side of FIG. 10. When the force on presser plate 73 is released, rollers 103 move roughly horizontally toward shaft 81, as shown on the left side of FIG. 10.

Since rollers 103 approach tray T from the side, the distance over which they move is longer and the time required for the packaging operation is longer. However, the first embodiment enables larger trays to be packaged than can be handled by roller moving mechanism 7 of the first embodiment (FIG. 9).

In other words, with roller mechanism 7 (FIG. 9), rollers 3 must be long enough to accommodate the entire planar area defined by the maximum and minimum size of tray T used because rollers 3 move chiefly up and down, but the stroke of the movement that establishes contact with tray T is smaller. Also, when the slant angle of rollers 3 is increased, it is sometimes necessary to change the stroke depending on the size of tray T.

Meanwhile, with roller moving mechanism 107 (FIG. 10), rollers 103 do not need to be particularly long even when tray T is large because rollers 103 move chiefly horizontally. Also, the angle of rollers 103 with respect to tray T can be set relatively freely. However, the movement stroke must be large enough to accommodate the maximum and minimum size of tray T. Furthermore, a separate mechanism that forces rollers 3 inward is needed because sufficient sealing pressure cannot be obtained by simply using the weight of rollers 103.

(B)

In the first embodiment, rollers 3 are heated by a heating means disposed within rollers 3. However, it is also possible to use a configuration wherein the heating means is positioned separately from rollers 3 and heats rollers 3 using microwaves or ultrasound.

Although, here, a configuration wherein rollers 3 roll on flange f of tray T is used to reduce the occurrence of wrinkling in film Fm and the development of holes in the portion of film Fm covering opening o during thermal welding, it is not imperative that a rolling member be used on flange f. For example, a heated member with low frictional resistance might be configured to slide as it moves along flange f. In such a case, in order to reduce resistance to the motion, it is desirable to apply a friction reducing treatment to at least that portion of the member which contacts the portion of film Fm resting on flange f.

(C)

In the first embodiment, the surface of rollers 3 is provided with a layer of material softer than the rest of the roller for the purpose of increasing the frictional resistance with respect to film Fm for sure rotation of the roller 3. However, it is also possible to treat the surface of rollers 3 so that the resistance reduces and change the sealing conditions.

(D)

In the first embodiment, moving section 63 of lift mechanism 6 is raised so that tray T pushes upward against film Fm, thus generating tension in film Fm. Depending on the strength of film Fm and the magnitude of the tension, there is the risk that film Fm will be damaged or that tray T will be unnecessarily deformed. In order to reduce this risk, the development of excessive tension in film Fm when moving section 63 of lift mechanism 6 rises can be prevented by changing the positions of transport rollers 52a, 52b and/or the degree to which presser rollers 52c, 52d hold on to film Fm and synchronizing these changes with timing at which film Fm comes into contact with tray T.

In the first embodiment, the width Fh of film Fm is wider than the width Th of tray T (see FIG. 4). However, it is acceptable for the width Fh of film Fm to be smaller than the width Th of tray T if the width Fh exceeds the width Th of tray T when traverse tension is applied to film Fm. Thus the continuity of film Fm would not be severed as a result of sealing tray T and trouble wherein it becomes impossible for take-up section 53 to take up the film would not occur.

Second Embodiment

<Summary of the Apparatus>

Figure 11:
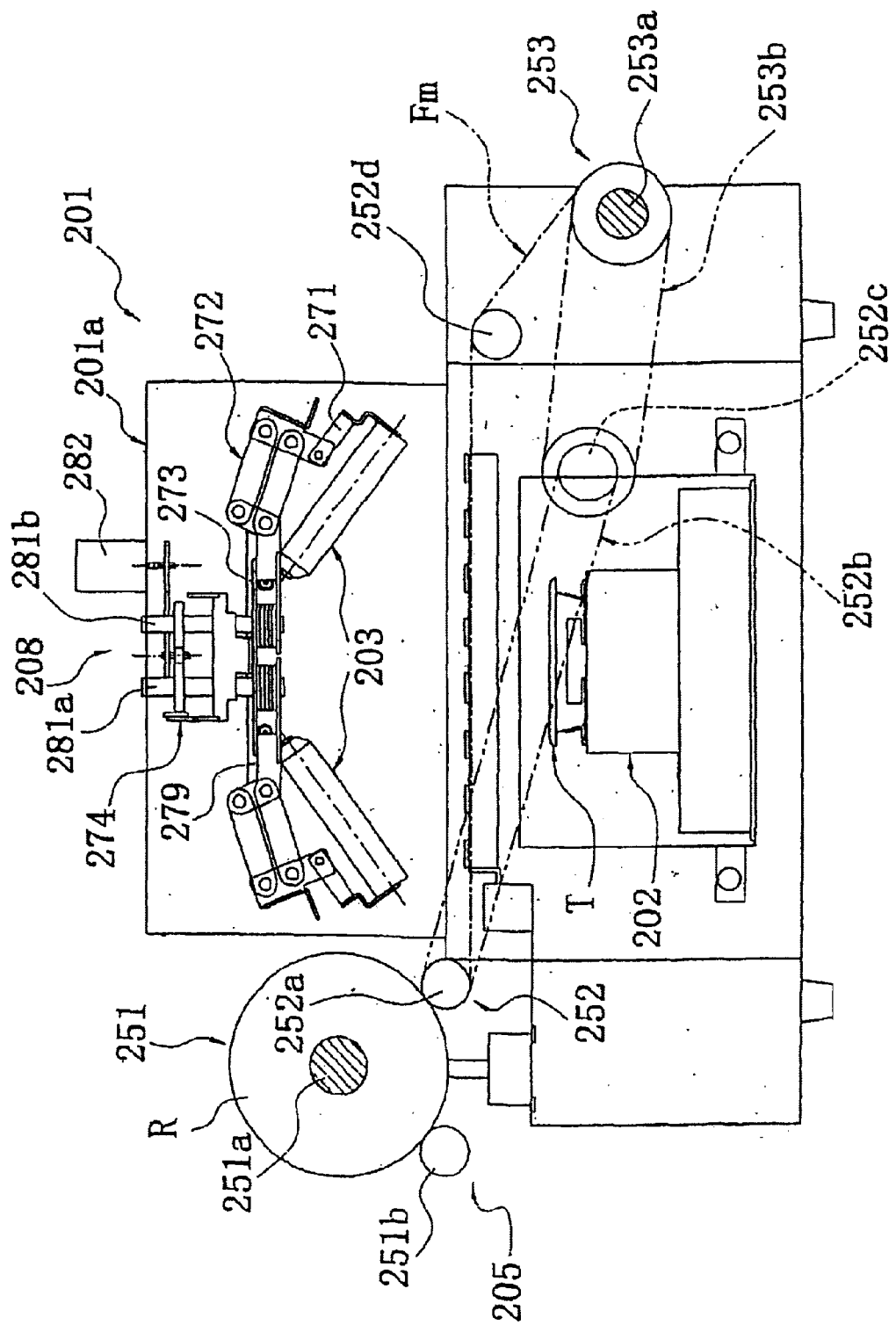
FIG. 11 is a traverse cross section of the packaging apparatus in the second embodiment.
Figure 12:
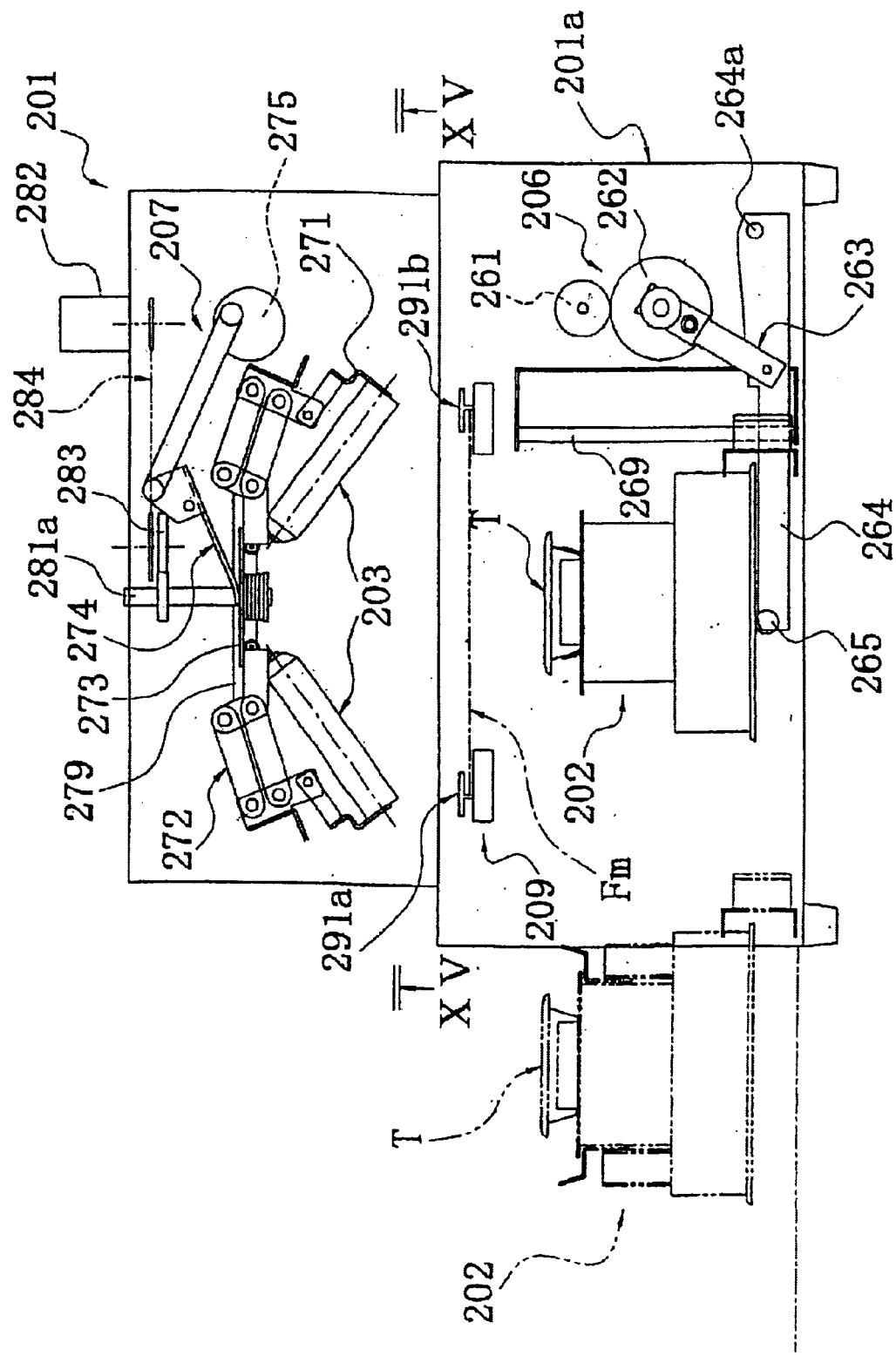
FIG. 12 is a longitudinal cross section packaging apparatus in the second embodiment.

Second embodiment of a top-seal packaging apparatus in accordance with the present invention is shown in FIGS. 11 and 12. The packaging apparatus 201 shown in the figures is an apparatus wherein the opening o in the upper portion of a tray T containing meat, fish, or other perishable food product or a side dish or other processed food product is covered with a stretch film Fm (see FIG. 17) and sealed by thermally welding stretch film Fm to a flange (periphery of the opening) f, which is disposed around the periphery of opening o in tray T.

<Constitution of the Apparatus>

Packaging apparatus 201 comprises the following components: a frame 201a; a tray-holding mechanism 202, which holds tray T; four rollers 203 positioned above tray-holding mechanism 202; a film transport mechanism 205, which feeds stretch film Fm between tray-holding mechanism 202 and rollers 203; a lift mechanism 206, which raises and lowers tray-holding mechanism 202; a roller ascent-descent mechanism 207, which moves rollers 203 chiefly up and down; a roller swivel mechanism 208 with two swivel shafts, which swivels rollers 203 around the swivel shafts 281a, 281b; a stretch mechanism 209, which stretches stretch film Fm in the space between tray-holding mechanism 202 and rollers 203; and a controller (not shown), which controls each of the mechanisms.

<Detailed Descriptions of the Components>

(Tray-holding mechanism)

Tray-holding mechanism 202 holds tray T on its upper surface and is raised and lowered by lift mechanism 206. As shown in FIG. 12, the tray-holding mechanism 202 can be drawn out to the position indicated with a double-dotted chain line or pushed in to the position indicated with a solid line by a slide mechanism. This horizontal movement is accomplished manually or by a drive means (not shown). The slide mechanism is supported by pins and can hand the tray-holding mechanism 202 to lift mechanism 206.

Tray T may be placed on tray-holding mechanism 202 either manually by an operator or automatically by a separate transport apparatus.

(Rollers)

Each roller 203 comprises a cylindrical member that is axially supported by roller support 271 of roller ascent-descent mechanism 207 (discussed later) so that the roller can rotate freely. The surface of roller 203 is provided with a layer that is softer than other parts of the roller. More particularly, the surface of roller 203 is made of an elastomer, so that firm contact can be maintained between stretch film Fm and flange f even when small irregularities exist on the surface of flange f of tray T.

Here, the elastomer used is one that contains heat resistant silicon or fluoro rubber. Using this kind of elastomer reduces the chance that rollers 203 will damage the surface of tray T as they roll on the tray and reduces susceptibility to heat deterioration because the elastomer is highly heat resistant. Also, rollers 203 rolls surely and stretch film Fm is sealed without occurrence of pinholes and other defective things because the friction between roller 203 and film Fm is improved by using the elastomer. Such elastomers also provide good heat conduction and improve efficiency, and they reduce damage to the stretch film because they improve surface release properties.

Figure 15:
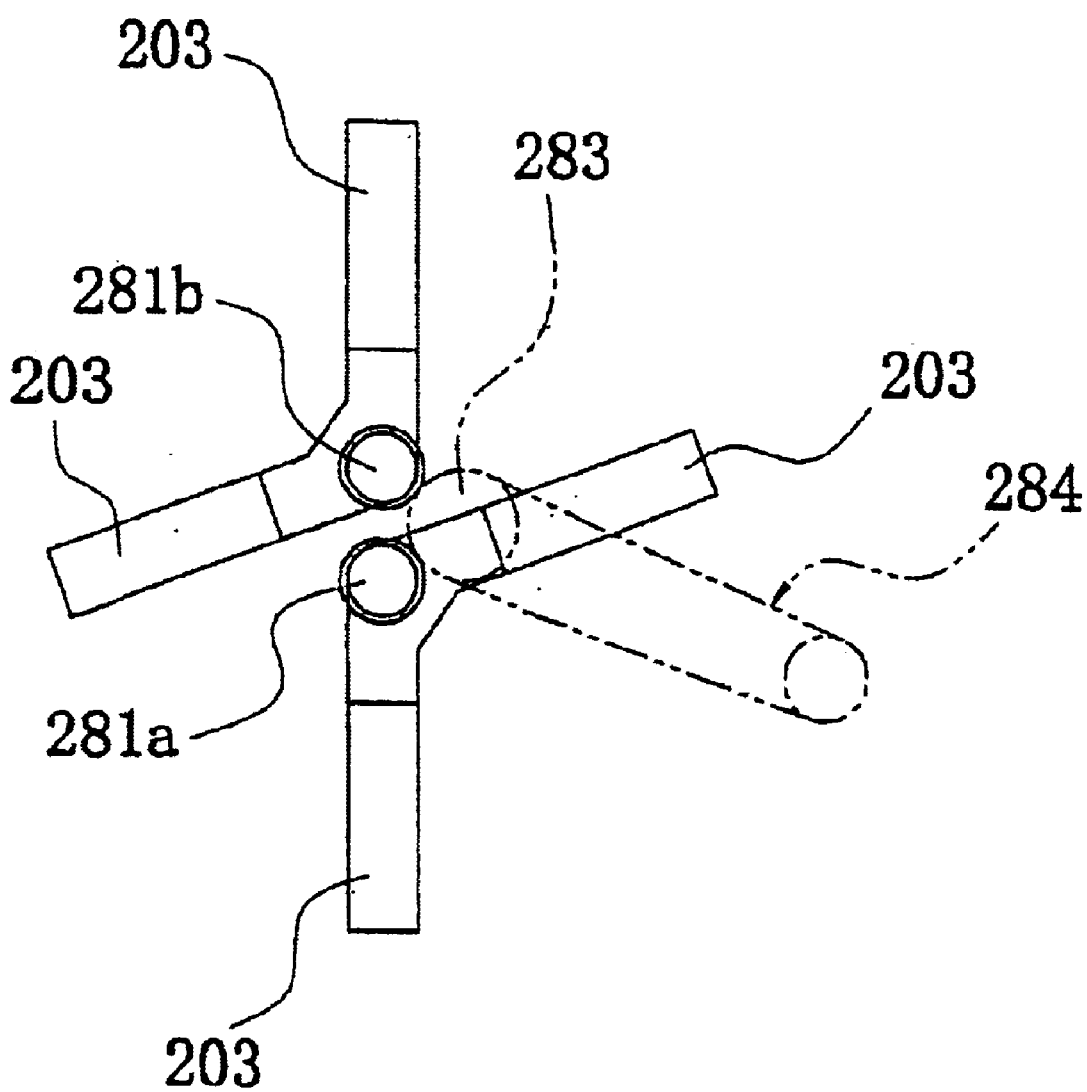
FIG. 15 is a planar arrangement of the rollers in the second embodiment (as viewed across a XV—XV line shown in FIG. 12).

As shown in FIG. 15, two rollers 203 are provided for each of swivel shafts 281a, 281b of roller swivel mechanism 208 (discussed later). FIG. 15 shows the arrangement of rollers 203 when viewed from underneath. Thus, from a planar perspective, rollers 203 are arranged as shown in FIG. 15 and are mounted to swivel shafts 281a, 281b at an angle of roughly 110°. FIG. 15 is a simplified figure and a planar arrangement of rollers 203.

As shown in FIGS. 11 and 12, rollers 203 are supported by roller supports 271 in such a manner that, when viewed from the side, they form an angle with respect to the horizontal plane containing the upper face of tray T. The angle is set so that the end of each roller 203 that is closer to swivel shafts 281a, 281b is higher than the other end.

Inside each roller 203 is a heating element (not shown) for heating the roller 203. Appropriate specifications for the heating element are selected based on the materials from which the tray T and stretch film Fm are made and the necessity of supplying energy that can quickly replenish the heat lost during the sealing operation.

(Film Transport Mechanism)

Film transport mechanism 205 delivers an amount of stretch film Fm that is appropriate for the size of tray T to the space between lowered tray-holding mechanism 202 and rollers 203. As shown in FIG. 11, film transport mechanism 205 comprises a film delivery section 251, a film transport section 252, and a film take-up section 253. Film delivery section 251, film transport section 252, and film talk-up section 253 are each supported by frame 201a.

The film delivery section 251 serves as the supply source of stretch film Fm and comprises members that rotatably support film roll R of stretch film Fm. Stretch film delivery section 251 has a core support member 251a, which can move up and down, and a support roller 251b, which supports film roll R at an angle from underneath. Film roll R is supported (see FIG. 11) by core support member 251a, support roller 251b, and delivery roller 252a of film transport section 252 (discussed later).

The film take-up section 253 has a take-up shaft 253a and is provided to take up the stretch film Fm that remains after a portion has been cut away to package (top-seal) tray T. Take-up shaft 253a is rotated by belt 253b, which is connected to motor 252c (discussed later).

The film transport section 252 is provided with: delivery roller 252a; motor 252c, which rotates delivery roller 252a via belt 252b; and film support roller 252d. The stretch film Fm taken from film roll R is fed toward film take-up section 253 by the rotation of delivery roller 252a. Film delivery roller 252a and support roller 251b are disposed symmetrically with respect to core support member 251a. The distance between delivery roller 252a and support roller 251b is set to be smaller than the diameter of the core of film roll R. These rollers 252a, 251b prevent film roll R from dropping down. Film support roller 252d is positioned close to film take-up roller 253 and its height is set so that its upper surface is aligned with the lower surface of delivery roller 252a (see FIG. 11).

(Stretch Mechanism)

Stretch mechanism 209 grips both sides of stretch film Fm, which runs from film delivery section 251 to film take-up section 253, in the horizontal section between delivery roller 252a and film support roller 252d and stretches stretch film Fm in the traverse direction (horizontal direction in FIG. 12). Stretch mechanism 209 is provided with a pair of film grippers 291a, 291b extending in the film transport direction and a stretch drive section (not shown), which moves the grippers perpendicularly (horizontal direction in FIG. 12) to the film transport direction.

Film grippers 291a, 291b comprise a mechanism that grips stretch film Fm by sandwiching it from the top and bottom and are turned ON and OFF using a solenoid. Slippage between film grippers 291a, 291b and stretch film Fm is prevented by mounting a rubber (or resin) pad having a large coefficient of friction on the part that contacts the upper side of stretch film Fm.

The stretch drive section comprises a guide rail, a motor, a sprocket, a chain, etc., and moves film grippers 291a, 291b to the left and right (when viewed as shown in FIG. 12) in response to instructions from the controller.

(Lift Mechanism)

Figure 13:
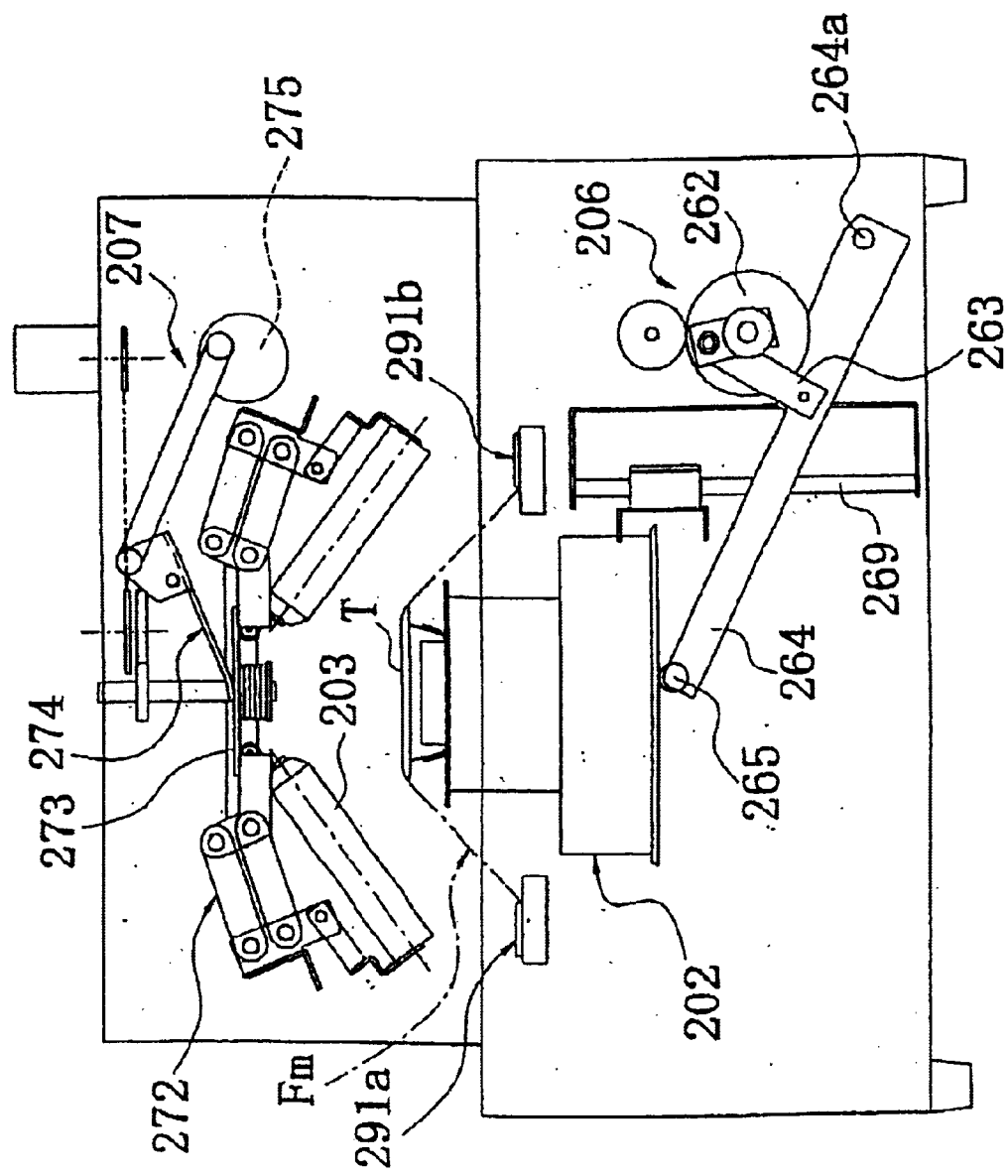
FIG. 13 illustrates the operation of the packaging apparatus in the second embodiment.

Lift mechanism 206 is a mechanism for lifting tray-holding mechanism 202, while the same holds a tray T, against stretch film Fm, as shown in FIG. 13. Lift mechanism 206 comprises: a drive motor 261; large gear 262, which is axially supported by frame 201a; link member 263; lever 264, one end of which is axially supported by frame 201a at support point 264a; disk member 265, which is rotatably mounted to the end of lever 264; etc.

When drive motor 261 operates, a gear affixed to the motor shaft rotates large gear 262 and link member 263 causes lever 264 to pivot about support point 264a. As a result, tray-holding mechanism 202 moves up or down (see FIGS. 12 and 13) because its underside is supported by disk member 265. Also, tray support mechanism 202 is guided by vertical guide rails 269 and moves in the vertical direction in response to the operation of lift mechanism 206.

(Roller Ascent-descent Mechanism)

Roller ascent-descent mechanism 207 is a mechanism for changing the vertical position of rollers 203 and, as shown in FIG. 11, comprises: roller supports 271, which axially support rollers 203; link mechanism 272; presser plate 273; lever mechanism 274, which applies a force to the upper side of presser plate 273; and motor 275, which operates lever mechanism 274.

Figure 14:
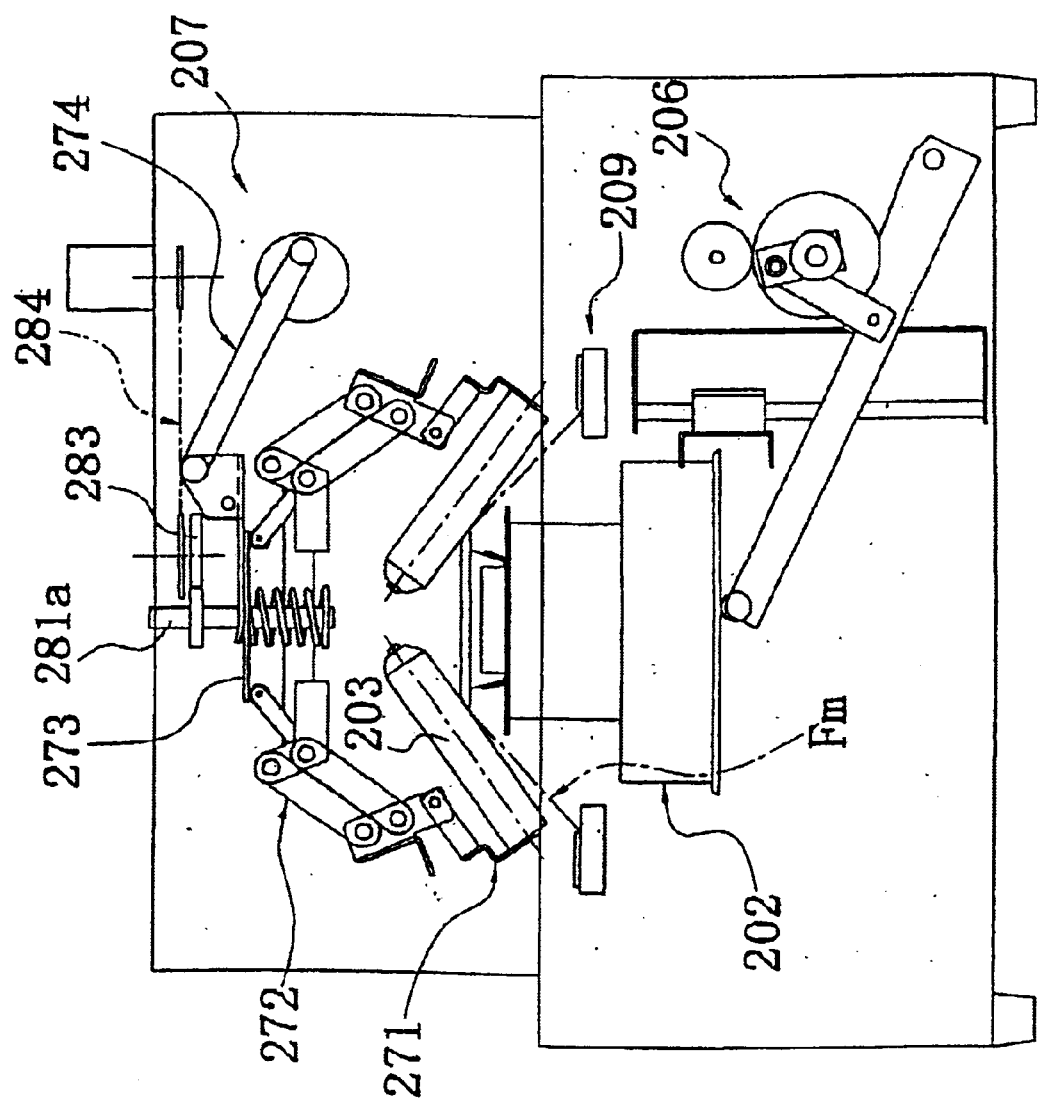
FIG. 14 illustrates the operation of the packaging apparatus in the second embodiment.

Roller supports 271 axially support rollers 203 in such a manner that rollers 203 are angled as shown in FIGS. 11 and 12 when viewed from the side. The rotational axis of each roller 203 is indicated in FIGS. 11 and 12 by a single-dotted chain line passing through the roller 203. One end of link mechanism 272 supports roller support 271 with a pin and the other end is pressed downward by presser plate 273. When the other end of link mechanism 272 is pressed down by presser plate 273, the one end is raised as shown in FIGS. 11 and 12. As a result, roller support 271 and roller 203 are also brought to a raised position. Meanwhile, when presser plate 273 no longer applies a force to link mechanism 272, the opposite end of link mechanism 272 moves down due to the weight of roller support 271 and roller 203 (see FIGS. 12 and 14).

The force that moves presser plate 273 is provided from above by lever mechanism 274, which is driven by motor 275. The outer edge of presser plate 273 rests on a rolling member axially supported on the other end of link mechanism 272 (see FIG. 19).

(Roller Swivel Mechanism)

Roller swivel mechanism 208 swivels rollers 203, as well as the roller supports 271 and link mechanisms 272 that support them, through a prescribed angle when the package is being sealed. Roller swivel mechanism 208 comprises chiefly: a first swivel shaft 281a; a second swivel shaft 281b; and a motor 282, which rotates both swivel shafts 281a, 281b.

The lower end of first swivel shaft 281a is fixed to a base 279, which supports two of link mechanisms 272, and the upper end is meshed with main gear 283 via a gear. Main gear 283 is connected to motor 282 by a pulley and a belt 284 and rotates when motor 282 operates.

The lower end of second swivel shaft 281b is fixed to a separate base 279 (a separate member from the base 279 to which first swivel shaft 281a is fixed), which supports the other two link mechanisms 272. The upper end of second swivel shaft 281b is meshed with main gear 283 via a gear (see FIG. 15).

Figure 16:
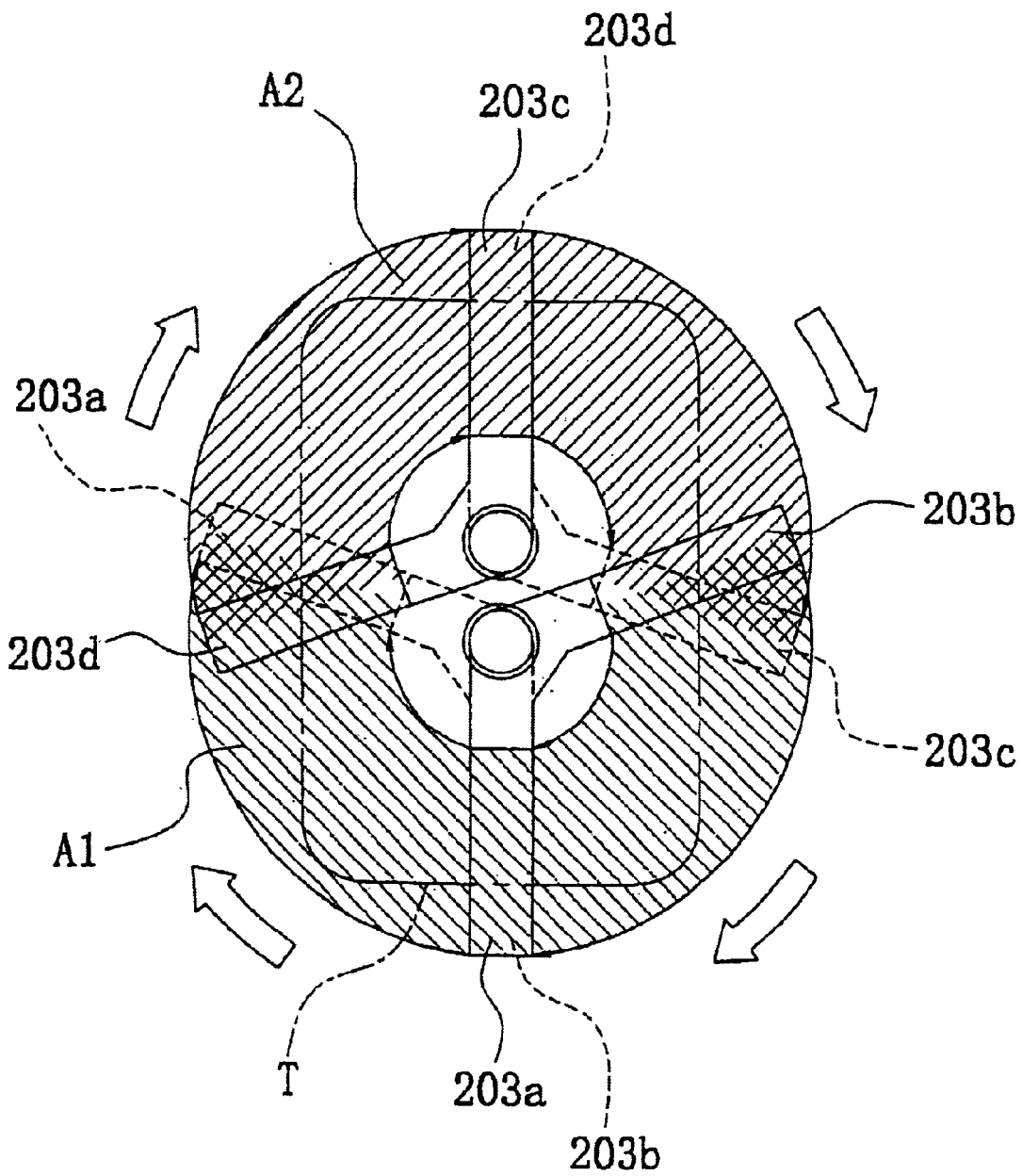
FIG. 16 is a planar path of the rollers resulting from swiveling in the second embodiment.

When motor 282 responds to instructions from the controller and rotates swivel shafts 281a, 281b over a prescribed angle, each roller 203 revolves through the prescribed angle about first swivel shaft 281a or second swivel shaft 281b (see FIG. 16). In FIG. 16, for clarity, the rollers 203 linked to first swivel shaft 281a are indicated as roller 203a and roller 203b and the rollers 203 linked to second swivel shaft 281b are indicated as roller 203c and roller 203d. Also, in FIG. 16, the positions of rollers 203 before swiveling are indicated with solid lines and the positions of rollers 203 after swiveling are indicated with dotted lines.

<Control Operations of the Apparatus>

Once a tray T containing a food product or other article is loaded onto tray-holding mechanism 202, which has been drawn out to the position indicated with a double-dotted chain line in FIG. 12, tray-holding mechanism 202 is moved horizontally under rollers 203 by hand or using a driving means not shown.

After tray-holding mechanism 202 has moved underneath rollers 203, multiple holding members push against the sides of tray T and position tray T, thus holding tray T so that tray T is prevented from moving out of place.

Additionally, when tray T is loaded onto tray-holding mechanism 202, a camera (not shown) detects the size of tray T and sends the size data to the controller.

Based on the size of tray T, the controller identifies the type of tray T and calculates the amount of stretch film Fm to be fed by film transport mechanism 205.

When the film transport mechanism 205 has fed the calculated amount of stretch film Fm, the controller operates stretch mechanism 209 to stretch stretch film Fm in the traverse direction (horizontal direction in FIG. 12). As a result, stretch film Fm is tensioned in the traverse direction and has no wrinkles.

Next the controller operates lift mechanism 206 and lifts tray-holding mechanism 202, which is holding tray T. Tray T pushes stretch film Fm upward and stops (see FIG. 13).

Next the controller controls motor 275 so as to release the downward force lever mechanism 274 applies to presser plate 273, thus releasing link mechanism 272. As a result, rollers 203 move down into contact with tray T due to their own weight (see FIG. 14). Since rollers 203 are independent of one another, each roller 203 contacts tray T with roughly the same pressure.

Next the controller instructs motor 282 to rotate swivel shafts 281 through a prescribed angle. The prescribed angle is set so that the entire flange f of tray T will be sealed by one of rollers 203a through 203d; in this embodiment, an angle of 110° is used (see FIG. 16).

When rollers 203 are swiveled about swivel shafts 281a, 281b and begin to roll over the stretch film Fm on tray T, rollers 203 thermally weld stretch film Fm to flange f of tray T.

Figure 17:
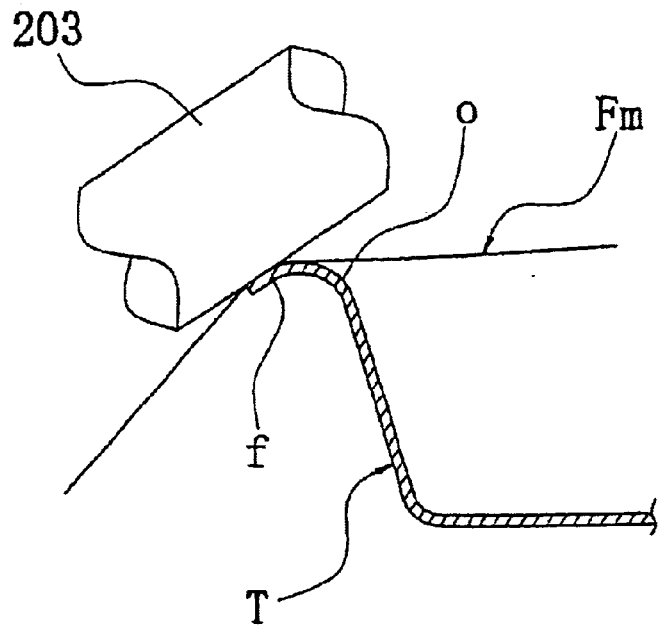
FIG. 17 is an enlarged view of the flange area when the rollers contact the tray in the second embodiment.
Figure 18:
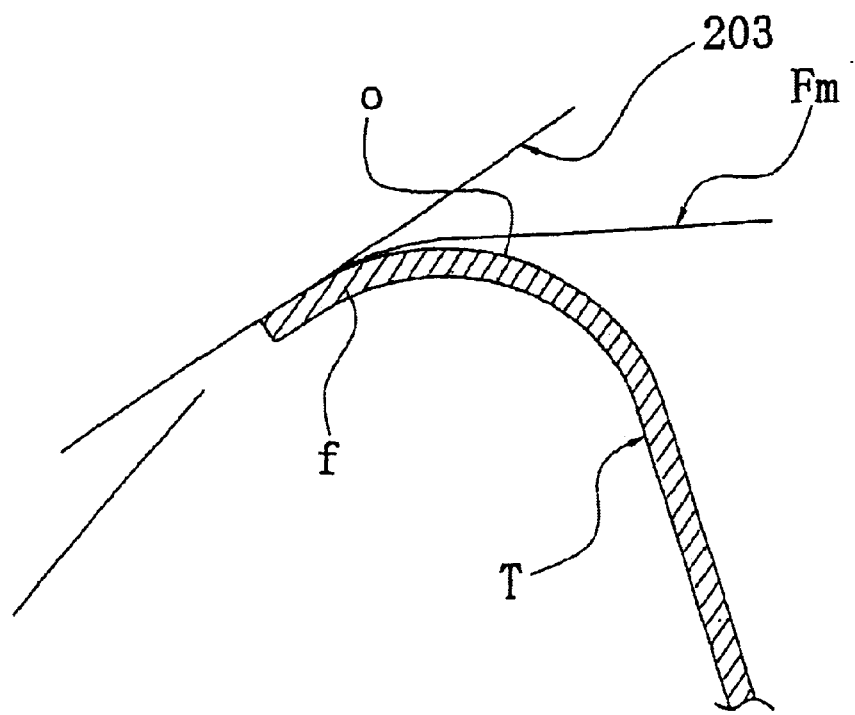
FIG. 18 is an enlarged view of the flange area when the film is thermally welded to the tray in the second embodiment.

FIG. 17 shows an enlarged view of the contact area between rollers 203 and tray T when the former move along the periphery of the latter. The opening o of tray T is covered by stretch film Fm, and stretch film Fm is pressed against flange f of tray T. Rollers 203 touch diagonally against the portion where stretch film Fm contacts flange f and apply both heat and pressure. This heat and pressure causes stretch film Fm and flange f to thermally fuse together. At the same time, stretch film Fm melts and is cut away at the edge portion (which is, in this case, a portion to the outside of the apex of flange f where rollers 203 are touching) of tray T because the heat and pressure are concentrated on stretch film Fm at the edge portion of tray T (see FIG. 18). The controller swivels rollers 203 at a speed that allows the stretch film to be thermally cut along the outside of the portion bonded by thermal welding while stretch film Fm is being thermally welded to flange f.

After rollers 203 have finished sealing stretch film Fm to tray T, rollers 203 are raised and tray T is lowered. Then the sealed tray T is removed from drawn out tray-holding mechanism 202 and the next cycle begins.

When the next cycle begins, stretch film Fm, of which a portion has been thermally cut away in the process of sealing tray T, is wound onto take-up shaft 253a. At the same time, motor 252c rotates film support roller 252d and delivery roller 252a so that the stretch film Fm for the next cycle is fed (supplied to the area below rollers 203) simultaneously with the taking up of the cut film.

The width of stretch film Fm is selected so that the width of the film will be exceed the width of tray T when the film is stretched by stretch mechanism 209. Thus, the continuity of stretch film Fm is not severed as a result of sealing tray T (i.e., cutting a hole in stretch film Fm) and trouble wherein it becomes impossible for film take-up section 253 to take up the film does not occur.

<Features of the Packaging Apparatus>

(1)

With this apparatus 201, roller swivel mechanism 208 is provided with two swivel shafts 281a, 281b so that rollers 203a, 203b are swiveled about first swivel shaft 281a and rollers 203c, 203d are swiveled about second swivel shaft 281b (FIG. 16). Since the positions of first and second swivel shafts 281a, 281b are planarly separated, the movement area over which rollers 203 can be moved is the total of the swivel areas of both swivel shafts 281a, 281b.

Looking at FIG. 16, the movement area for rollers 203a through 203d is the total of swivel area A1 and swivel area A2, where swivel area A1 is the area over which first swivel shaft 281a moves rollers 203a, 203b and swivel area A2 is the area over which second swivel shall 281b moves rollers 203c, 203d.

Therefore, even if the tray has a large length-to-width ratio, the rollers 203 can be moved so that entire flange f is accommodated by aligning the lengthwise direction of the direction in which the two swivel shafts 281a, 281b are separated.

Furthermore, when packaging trays having a large length-to-width ratio, the variance in the amount of time rollers 203 touch each part of flange f is reduced in comparison to when the rollers are swiveled by a single swivel shaft.

(2)

With this apparatus 201, two rollers 203a, 203b are swiveled about first swivel shaft 281a and two rollers 203c, 203d are swiveled about second swivel shaft 281b. Therefore, the time required for packaging (thermal welding) is reduced in comparison to when only one roller is coupled to each swivel shaft.

(3)

With this apparatus 201, rollers 203 contact only the portion of stretch film Fm that is on flange f and do not touch the portion of stretch film Fm covering opening o of tray T (see FIGS. 17 and 18) because rollers 203 are applied to flange f at an angle (slanted with respect to a horizontal plane). As a result, the portion of stretch film Fm covering opening o is less likely to melt or develop tiny holes.

(4)

With this apparatus 201, the pressure applied to flange f of tray T during thermal welding can be adjusted by changing the slant angle of rollers 203. The sealing time can also be adjusted by controlling the rotation of motor 282 so as to change the speed and speed curve of swivel shafts 281a, 281b. By combining temperature control of the heating elements that heat rollers 203 with the ability to adjust the pressure and sealing time, sealing conditions that are well matched to tray T and stretch film Fm can be established.

(5)

With this apparatus 201, since the stretch film Fm is tensioned by stretch mechanism 209 when tray T is lifted, the problem of wrinkles existing in stretch film Fm after stretch film Fm is sealed to tray T is almost eliminated.

(6)

With this apparatus 201, tray T is lifted up while both sides of stretch film Fm are gripped by film grippers 291a, 291b of stretch mechanism 209. Therefore, when the apparatus is in the state shown in FIG. 13 or 14, tension develops in the portions of stretch film Fm between tray T and each of the two film grippers 291a, 291b. The portions of stretch film Fm between tray T and delivery roller 252a and between tray T and film support roller 252d also develop tension. Since the portion of stretch film Fm around the perimeter (outside) of tray T is tensioned when heat sealing is conducted, thermal cutting of the outer portion of the thermally welded stretch film Fm is more easily accomplished and rollers 203 thermally cut stretch film Fm (see FIG. 18) in an reliable manner.

A Variation on the Second Embodiment

In the second embodiment, the planar positions of both swivel shafts 281a, 281b are fixed, but the range of applicable sizes and shapes of tray could be increased even further by making one or both shafts movable.

In this embodiment, swivel shafts 281a, 281b are replaced with swivel shafts 381a, 381b, which are planarly moveable in the film transport direction (the vertical direction in FIG. 19), and rollers 203 are connected to swivel shafts 381a, 381b. Swivel shafts 381a, 381b are moved planarly by an electric powered ball screw mechanism and crank mechanism based on instructions from the controller.

Figure 19:
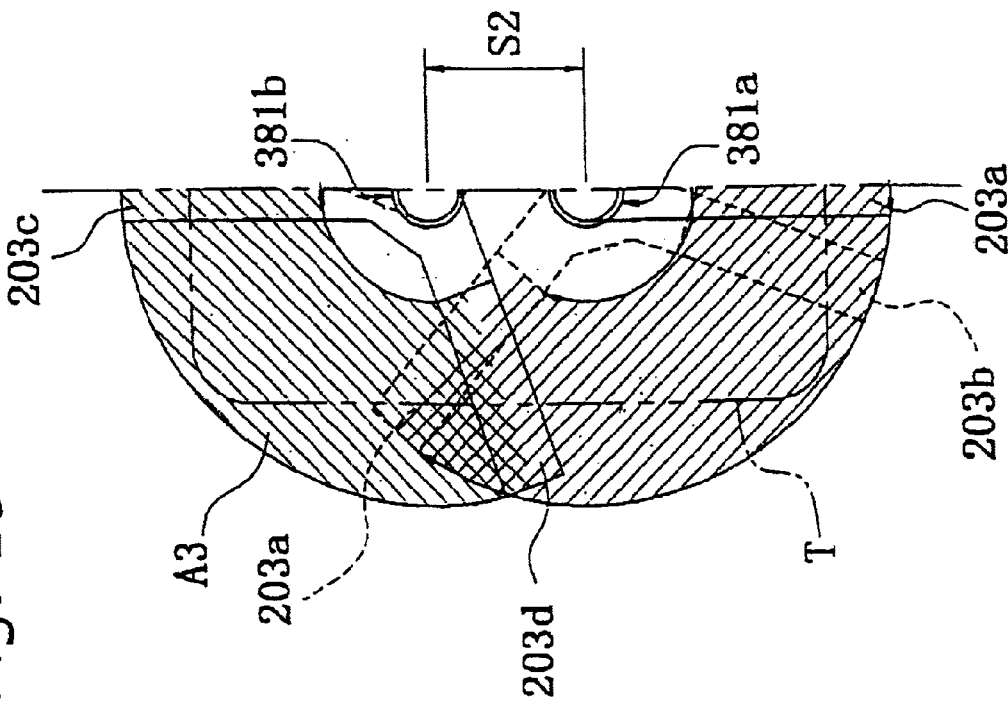
FIG. 19 illustrates how the roller path changes when the swivel shafts are moved in the second embodiment.
Figure 19:
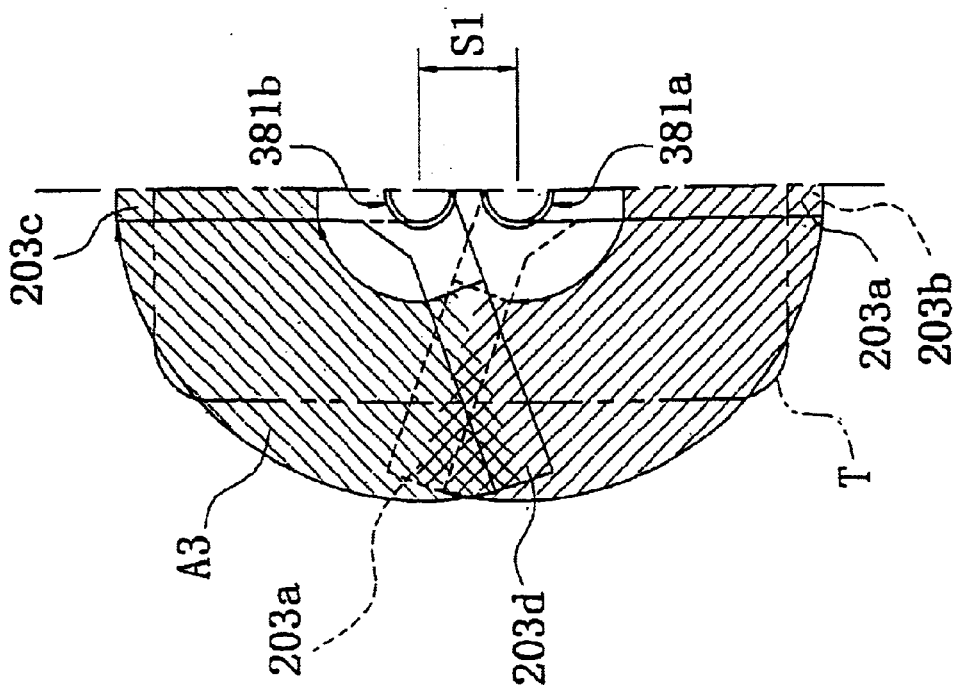

With this configuration, a large-sized tray T that extends outside swivel area A3 of rollers 203a through 203d when the distance between swivel shafts 381a, 381b is S1, as shown in FIG. 19(a), can be successfully heat sealed by moving swivel shafts 381a, 381b so that the distance between them increases to S2, as shown in FIG. 19(b), and thus expanding the swivel area of rollers 203a through 203d from A3 to A4. In FIG. 19, the positioning of rollers 203 before swiveling is indicated with solid lines and the positioning of rollers 203 after swiveling is indicated with dotted lines.

By controlling the swivel speed and also executing precise control of the motion between swivel shafts 381a, 381b, using the controller, the amount of time rollers 203 are in contact with each portion of flange f of tray T can be brought closer to a fixed value (optimum value).

Third Embodiment

In the Second embodiment, the movement area of rollers 203 is expanded by providing roller swivel mechanism 208 with two swivel shafts 281a, 281b. However, it is also possible to expand the movement area of rollers 203 by planarly moving a single swivel shaft.

<Constitution>

This embodiment adopts a configuration wherein single swivel shaft 481 is moved in the longitudinal direction of tray T (vertical direction in FIG. 20) using a moving mechanism (not shown). One roller 203 is connected to swivel shaft 481 using a base member and a link mechanism. Thus, roller 203 swivels around swivel shaft 481 when swivel shaft 481 rotates.

<Operation>

The first thing the controller does after it has lifted tray T upward against stretch film Fm and touched roller 203 against tray T is rotate swivel shaft 481 180°.

Figure 20:
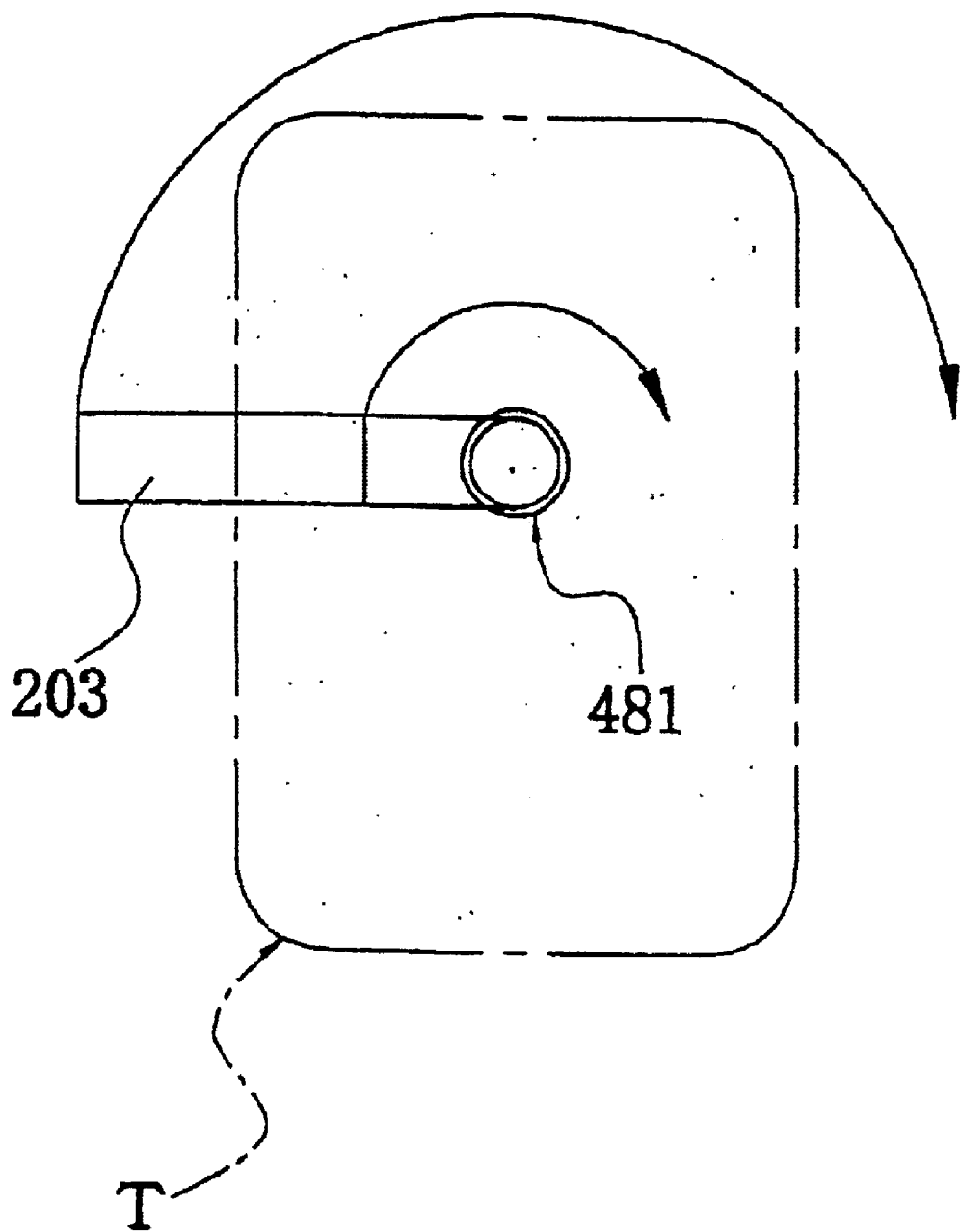
FIG. 20 illustrates the operation of the rollers in the third embodiment.
Figure 21:
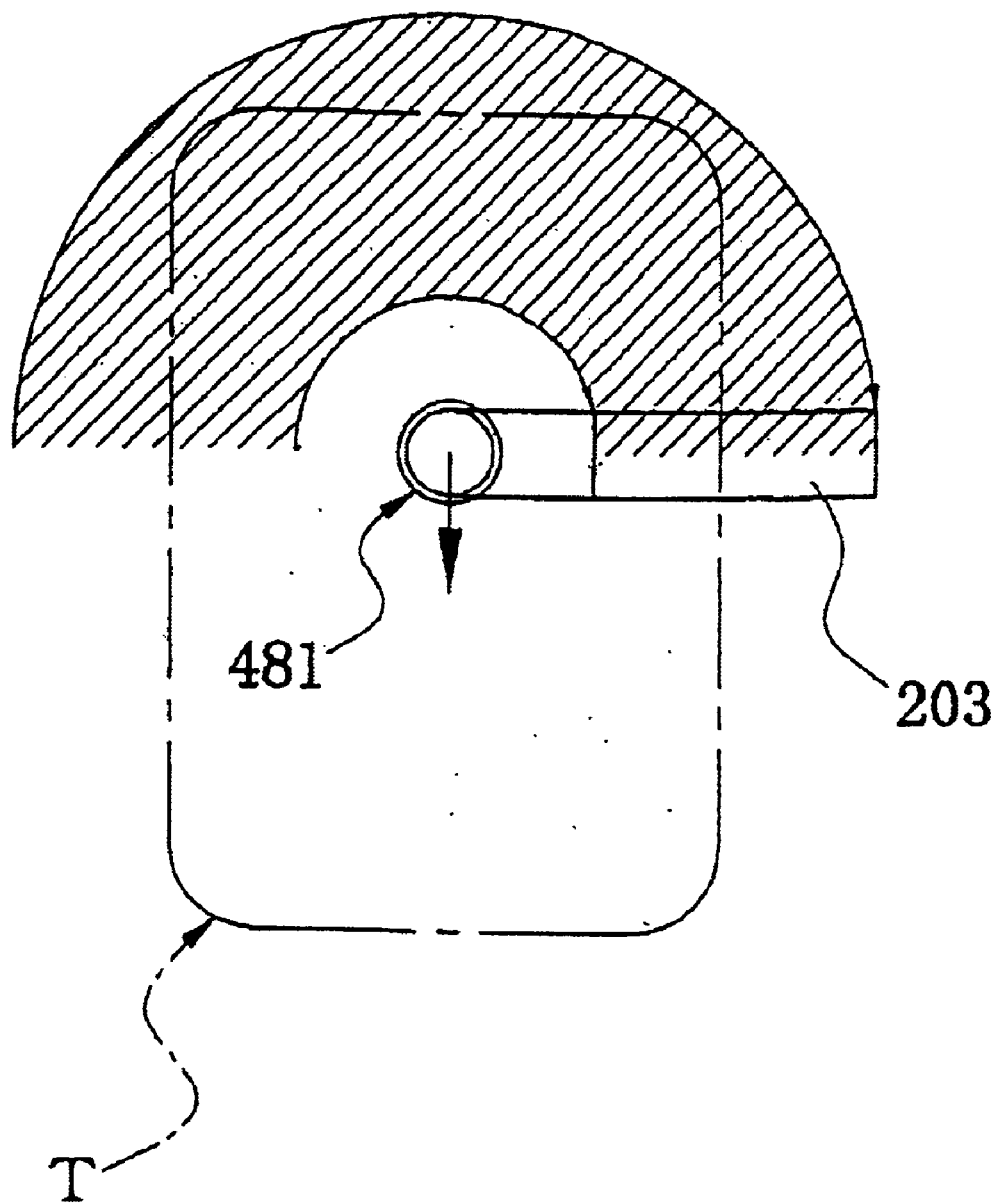
FIG. 21 illustrates the operation of the rollers in the third embodiment.

Then roller 203 swivels, moving from the state shown in FIG. 20 to the state shown in FIG. 21. The shaded area in FIG. 21 indicates the path of roller 203. The stretch film is thermally welded to the portion of the flange of tray T located in this area during the stage of the sealing process illustrated in FIG. 21.

Next the controller moves swivel shaft 481 horizontally. As a result, roller 203 also moves horizontally from the state shown in FIG. 21 to the state shown in FIG. 22. This movement results in the stretch film being thermally welded to the middle portion of one of the long sides of tray T.

Figure 22:
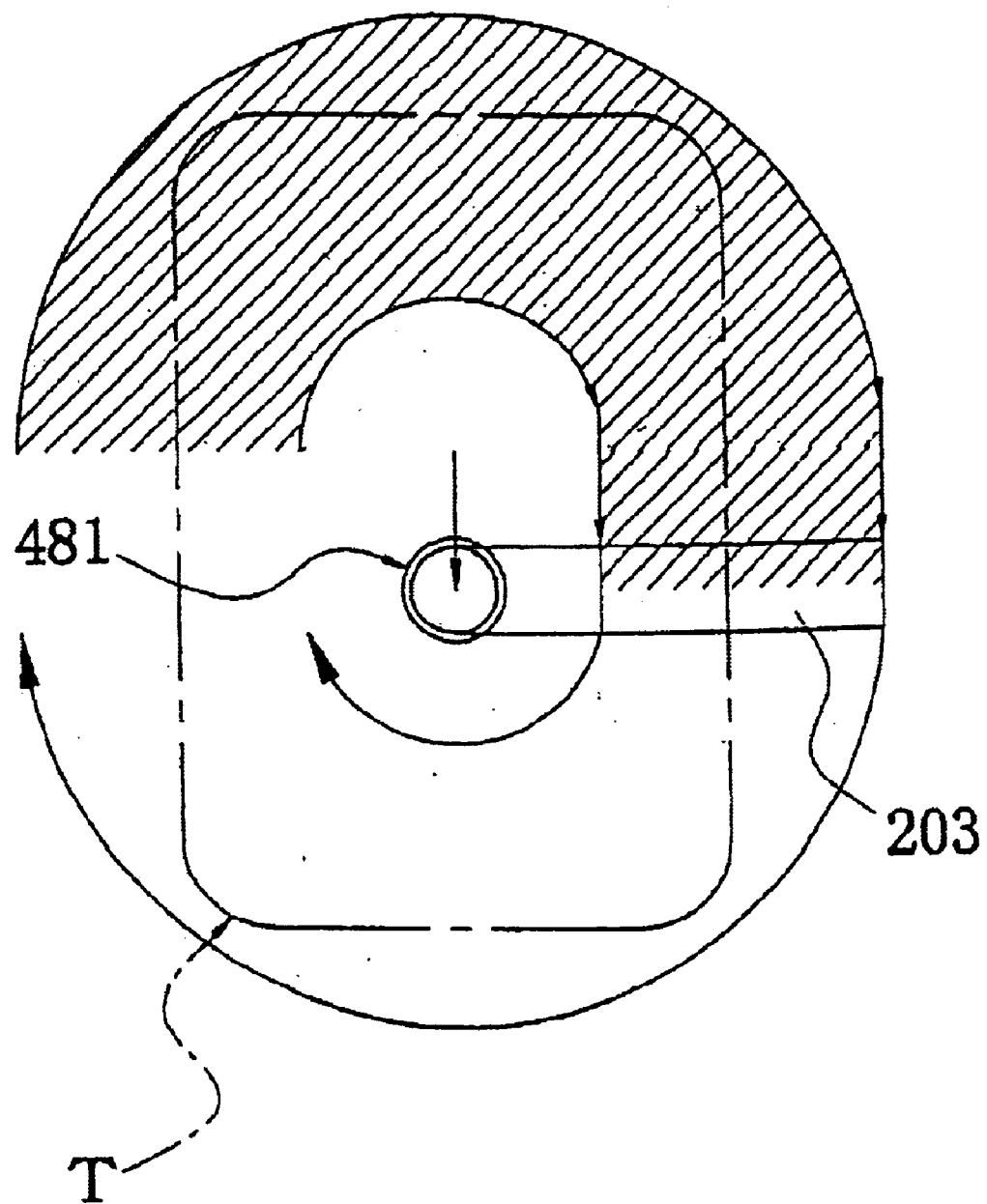
FIG. 22 illustrates the operation of the rollers in the third embodiment.
Figure 23:
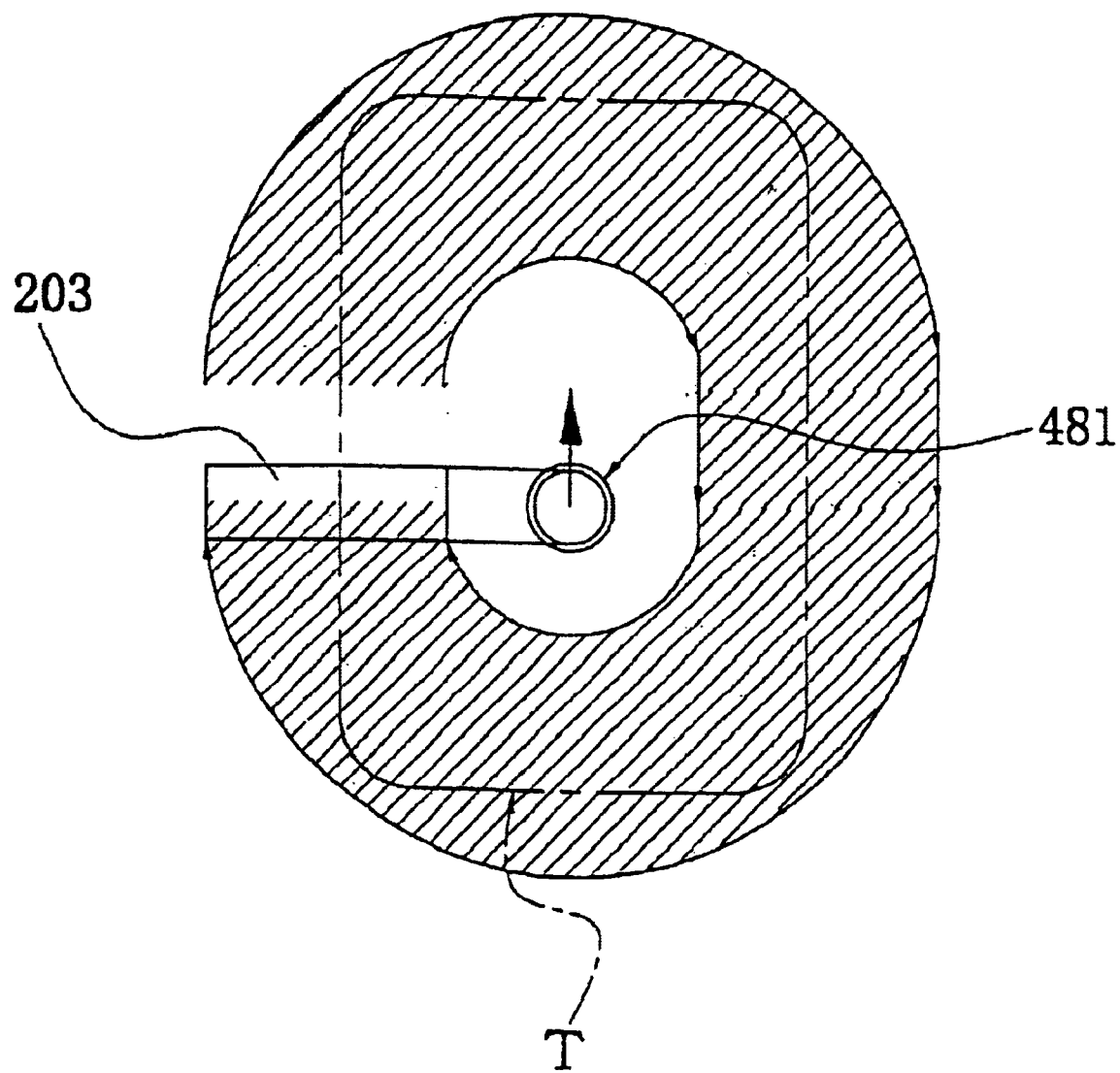
FIG. 23 illustrates the operation of the rollers in the third embodiment.
Figure 24:
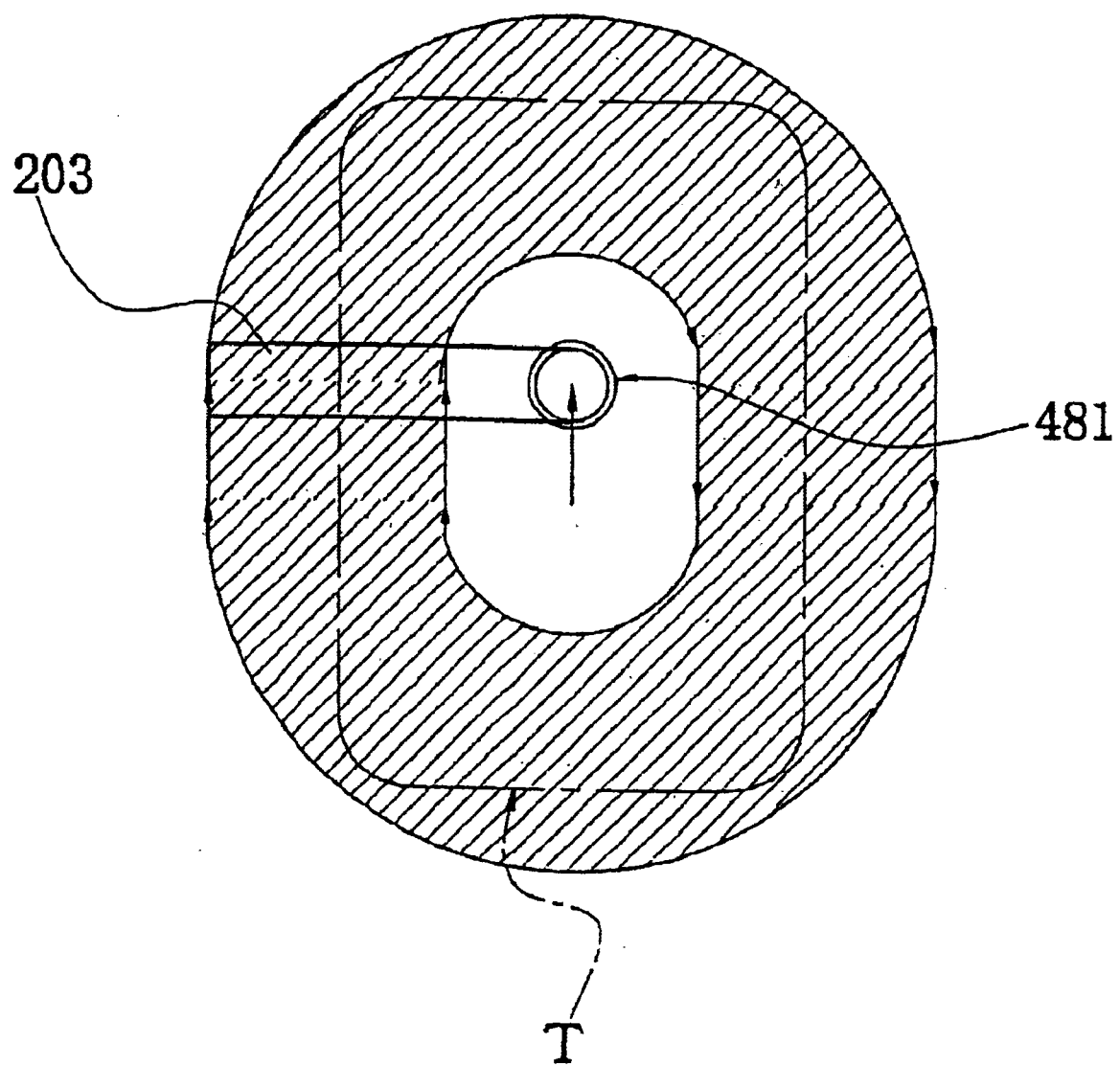
FIG. 24 illustrates the operation of the rollers in the third embodiment.

The controller then rotates swivel shaft 481 180°, causing roller 203 to move from the state shown in FIG. 22 to the state shown in FIG. 23. Next swivel shaft 481 is moved horizontally back to its original position (see FIG. 24) and roller 203 completes a path around the entire flange of tray T. Thus, the stretch film is thermally welded so that the opening in tray T is sealed.

<Features>

In addition to a roller swivel mechanism 208 for swiveling roller 203, this embodiment of the packaging apparatus is provided with a moving mechanism that moves swivel shaft 481 planarly. When large rectangular trays or trays with a large length-to-width ratio are packaged, roller 203 is moved over the entire flange of the tray by moving swivel shaft 481. Thus, the entire flange can be accommodated even when the tray is of a shape (or size) that roller 203 cannot follow using swiveling alone, that is, a tray that extends outside the path of roller 203 (i.e., the movement area of roller 203) when swiveling alone is used.

Also, even in those situations where the path of roller 203 provided by swiveling alone accommodates the entire flange of the tray, the amount of time roller 203 touches each portion of the flange of the tray can be made more uniform by moving roller 203 using a combination of swiveling and planar motion. The amount of time roller 203 touches each portion of the flange of the tray can be brought even closer to a fixed value by controlling the swivel speed and the planar motion speed.

When packaging trays whose planar shape is circular, the amount of time roller 203 touches each portion of the flange of the tray can be made uniform by controlling the apparatus so that swivel shaft 481 remains planarly immobile.

A Variation on the Second and Third Embodiments (A)

In the second and third embodiments, rollers 203 are heated by a heating means disposed within rollers 203. However, it is also possible to use a configuration wherein the heating means is positioned separately from rollers 203 and heats rollers 203 using microwaves or ultrasound.

(B)

Although in the second and third embodiments, a configuration wherein rollers 203 roll on flange f of tray T is used to reduce the occurrence of wrinkling in stretch film Fm and the development of holes in the portion of stretch film Fm covering opening o during thermal welding, it is not imperative that a rolling member be used on flange f. For example, a heated member with low frictional resistance might be configured to slide as it moves along flange f. In such a case, in order to reduce resistance to the motion, it is desirable to apply a friction reducing treatment to at least that portion of the member which contacts the portion of stretch film Fm resting on flange f.

(C)

In the second and third embodiments, the surface of rollers 203 is provided with a layer of material softer than the rest of the roller. Therefore, the frictional resistance with respect to stretch film Fm is increased and rollers 203 roll surely. Adhesion of rollers 203 to stretch film Fm is also improved. However, it is also possible to treat the surface of rollers 203 so that the resistance reduces and change the sealing conditions.

(D)

Figure 25:
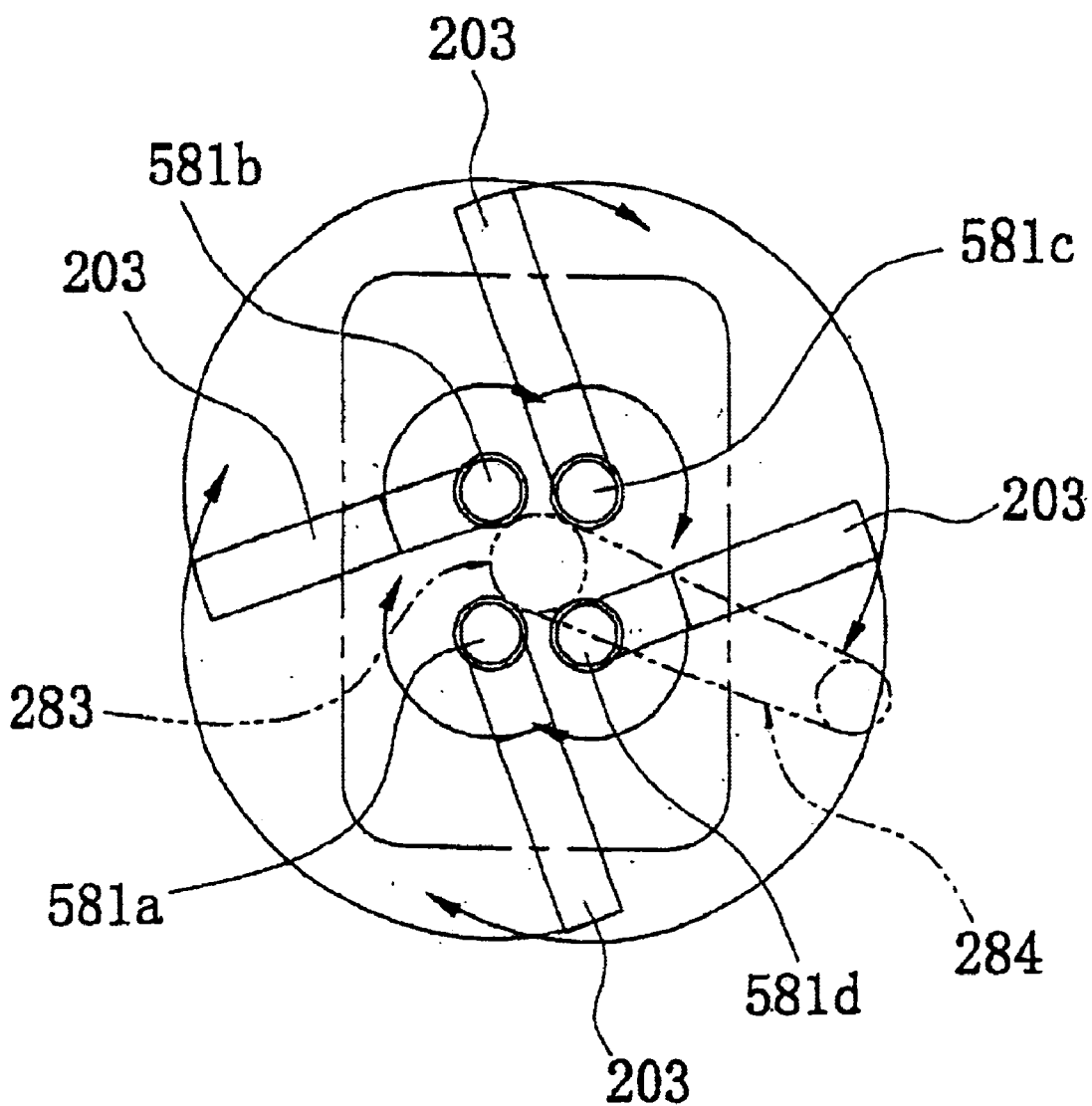
FIG. 25 is a plan view of the roller arrangement in the second and third embodiment.

In the second embodiment, roller swivel mechanism 208 is provided with two swivel shafts 281a, 281b and each swivel shaft 281a, 281b has two rollers 203 connected thereto. However, as shown in FIG. 25, it is also possible to provide the roller swivel mechanism with four swivel shafts 581a, 581b, 581c, 581d and connect one roller 203 to each swivel shafts 581a, 581b, 581c, 581d. Such a configuration would permit packaging with a similar processing time to that achieved with the second embodiment.

Although second embodiment adopts a configuration wherein the four swivel shafts 581a, 581b, 581c, 581d are meshed with the same main gear 283, it is also possible to provide each swivel shaft 581a, 581b, 581c, 581d with its own rotationally driving motor (four motors) and control the rotational speed of each swivel shaft 581a, 581b, 581c, 581d. Such a configuration would allow the amount of time rollers 203 touch each part of the flange of the tray to be made even more uniform.

Fourth Embodiment

While the first embodiment uses a roller swivel mechanism 8 to swivel rollers 3 against tray T as shown in FIG. 5, it is also acceptable to fix rollers 3 and rotate the tray against rollers 3.

Figure 26:
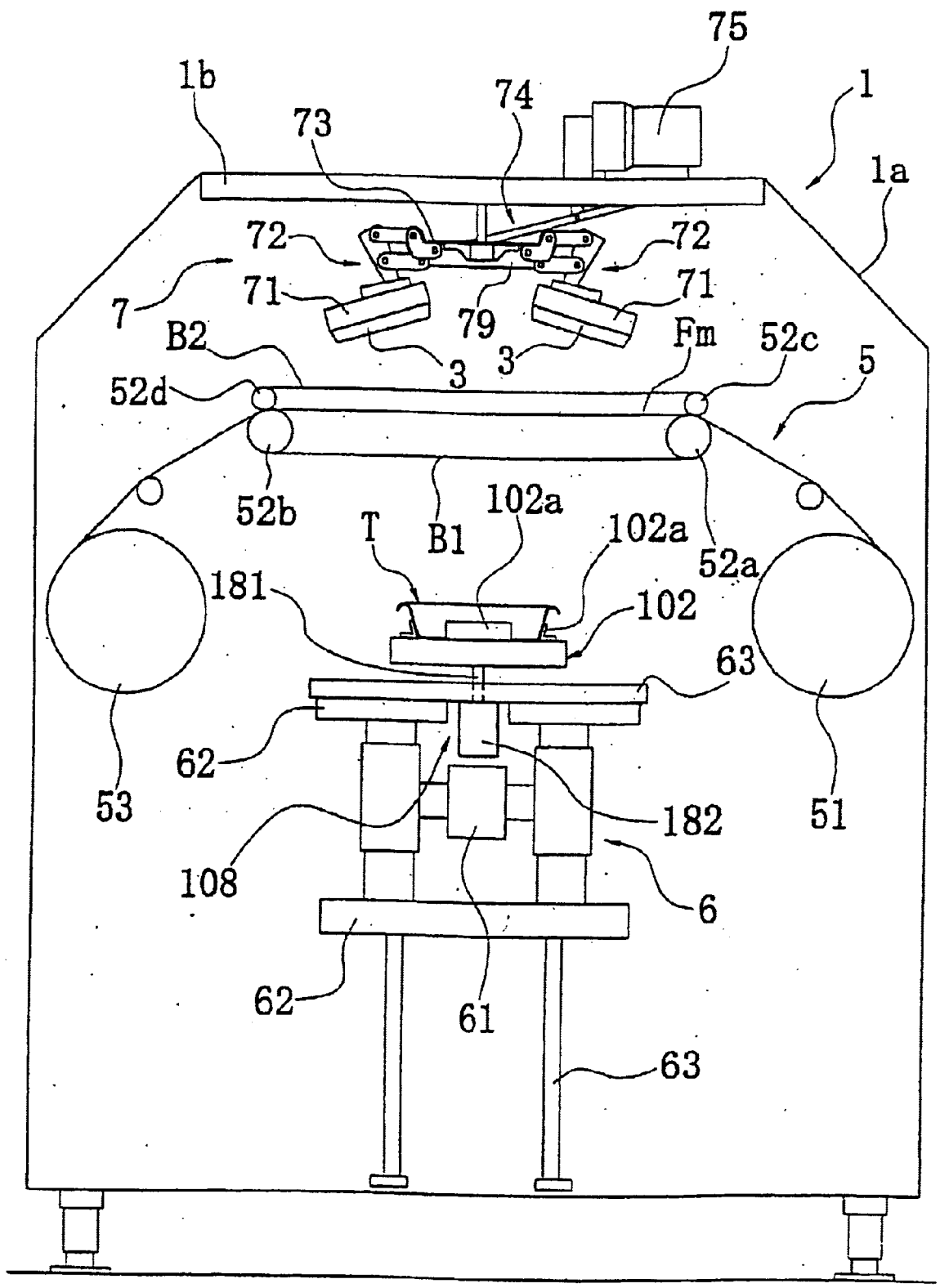
FIG. 26 is a schematic view of the packaging apparatus in the fourth embodiment.
Figure 27:
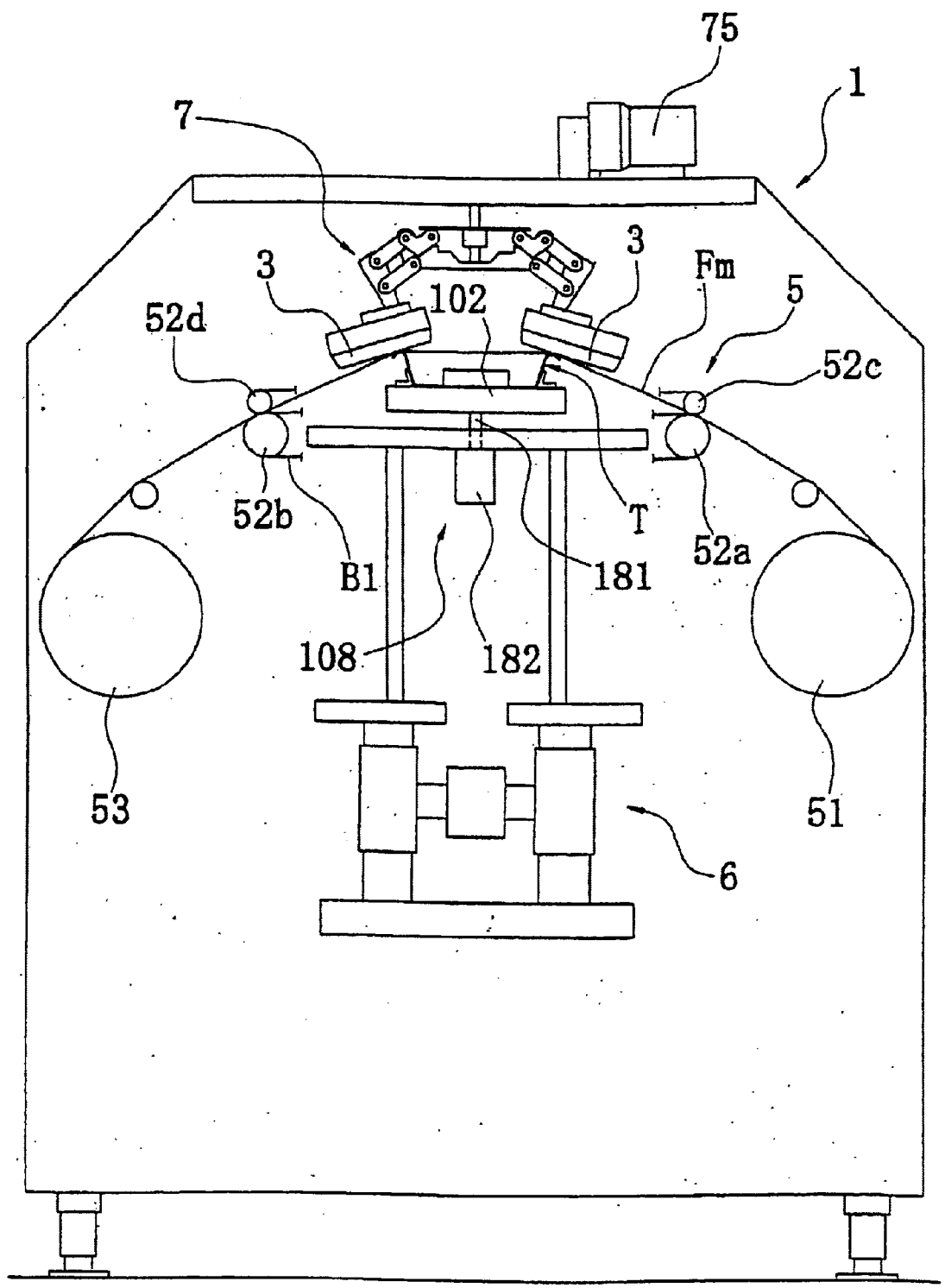
FIG. 27 is one state of the packaging apparatus in the fourth embodiment.

In the fourth embodiment, a tray rotation mechanism 108 is replaced with the roller swivel mechanism as shown in FIGS. 26 and 27. Therefore, rollers 3 do not swivel. But the roller moving mechanism 7 changes the vertical position of rollers 3.

Tray rotation mechanism 108 comprises shaft 181 and motor 182, which rotates shaft 181. The upper end of shaft 181 fixed to a tray-holding mechanism 102, which holds tray T. The lower end of shaft 181 is connected to motor 182.

When the controller starts motor 182, the tray-holding mechanism 102 rotates. The controller controls rotation of motor 182. Motor 182 fixed to a moving portion 63 of lift mechanism 6 (see FIGS. 26 and 27).

Tray-holding mechanism 102 holds tray T on its upper surface. Tray-holding mechanism 102 also holds the sides of tray T so that tray T is prevented from moving out of place, especially rotating. Tray-holding mechanism 102 has four side-holding members 102a pushing against the sides of tray T and prevent from moving as shown in FIG. 26.

<Control Operations of the Apparatus>

Figure 28:
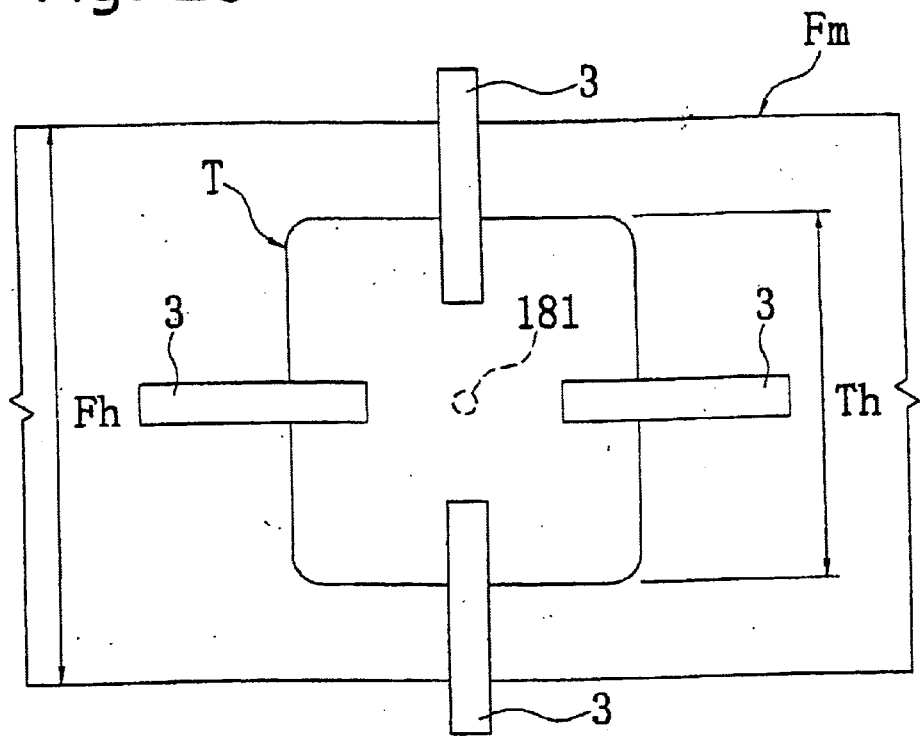
FIG. 28 is a plan view showing the arrangement of the tray and film in the fourth embodiment.

When a tray T is loaded onto tray-holding mechanism 102 and is held by side-holding members 102a as shown in FIG. 26, film feeding mechanism 5 feeds film Fm. Then, the two belts B1 that traverse transport rollers 52a, 52b and the two belts B2 that traverse presser rollers 52c, 52d are moved in a direction perpendicular to the transport direction (horizontal direction in FIG. 28). This movement of the belts stretches film Fm in the traverse direction (vertical direction in FIG. 28), thus tensioning film Fm in the traverse direction.

Lift mechanism 6 then lifts moving section 63 by the amount calculated by the controller based on the size of tray T; tray T pushes film Fm upward and stops. The upward pressure of tray T tensions film Fm in the transport direction.

Next the controller controls motor 75 so as to release the downward force lever mechanism 74 applies to presser plate 73, thus releasing link mechanism 72. As a result, rollers 3 move into contact with tray T due to their own weight (see FIG. 27). Since rollers 3 are independent of one another, each roller 3 contacts tray T with roughly the same pressure.

Figure 29:
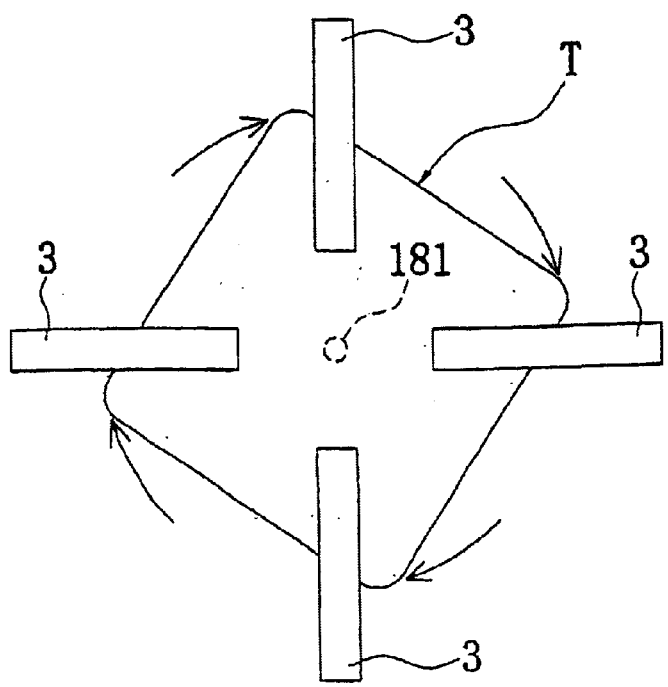
FIG. 29 is a rotational motion of tray in the fourth embodiment.

While simultaneously controlling motor 75 so that rollers 3 contact tray T, the controller instructs motor 182 of tray rotation mechanism 108 to rotate shaft 181 through a prescribed angle. Since four rollers 3 are provided at an even spacing with respect to the rotational direction (see FIG. 28), a prescribed angle of 90° would be sufficient for rollers 3 to seal the entire periphery of tray T. However, in this embodiment, a slightly larger angle of 100° is used. When shaft 181 turns and rollers 3 begin to rotate (see FIG. 29), rollers 3 follow along the periphery (flange f) of tray T and thermally weld film Fm to tray T, thus forming a seal. Here, rollers 3 roll on flange f as they move on account of rotation of tray T.

After rollers 3 have finished sealing film Fm to tray T, rollers 3 are raised and lift mechanism 6 lowers tray T. Then the sealed tray T is removed from tray rotation mechanism 108 and the next cycle begins. When the next cycle begins, film Fm, of which a portion has been thermally cut away in the process of sealing tray T, is taken up by driving take-up section 53. The width Fh of film Fm is set to be wider than the width Th of tray T (see FIG. 28); the continuity of film Fm is not severed as a result of sealing tray T and trouble wherein it becomes impossible for take-up section 53 to take up the film does not occur.

A Variation on the Fourth Embodiment

While the tray is rotated against rollers in the fourth embodiment and rollers are swiveled against tray in the first embodiment, it is also acceptable to rotate the tray and swivel rollers simultaneously.

INDUSTRIAL APPLICABILITY

With this invention, since the hot member and the tray are moved relative to each other, various shapes and sizes of tray can be accommodated. Unlike conventional top-seal methods, it is not necessary to prepare tools for each different type of tray and the efficiency of packaging operations can be improved.

Also, since the hot member is applied at an angle to the flange, the hot member does not come in contact with a portion of the film covering the opening. Consequently, the portion of the film that covers the opening is less likely to melt or develop tiny holes.

What is claimed is:

1. A packaging method comprising:
   putting an article to be packaged on a tray having an opening defined by a flange lying in a first plane in its upper face;
   covering the opening in the tray with a film substantially lying in the first plane;

touching a face of at least one heated hot member against the film on a portion of the tray near the opening where the film touches with the face of the heated hot member lying in a second plane forming an angle with the first plane when touching; and moving at least one of the heated hot member and the tray while the heated hot member is touching against the film on the portion of the tray.

2. A packaging method set forth in claim 1, wherein the moving of at least one of the heated hot member and the tray includes the heated hot member moving along a periphery of the opening in the tray.

3. A packaging method set forth in claim 1, wherein during the touching of the face of the at least one heated hot member against the film and the moving of at least one of the heated hot member and the tray, the heated hot member not only thermally welds the film to a portion of the tray near the opening but also cuts an outer portion of the thermally welded film.

4. A packaging method set forth in claim 1, wherein during the moving of at least one of the heated hot member and the tray, the heated hot member rolls as it moves along a periphery of the opening in the tray.

5. A packaging method set forth in claim 1, wherein during the moving of at least one of the heated hot member and the tray, the face of the heated hot member is varied relative to the first plane.

6. A packaging method comprising:

a first step of putting an article to be packaged on a tray having an opening in its upper face;

a second step of covering the opening in the tray with a film;

a third step of touching, in a direction intersecting with a vertical direction, a heated hot member against the film on a portion of the tray near the opening where the film touches; and a fourth step of moving the heated hot member while the heated hot member is touching against the film on the portion of the tray, the heated hot member being moved along a periphery of the opening in the tray by swiveling the heated hot member about a swivel shaft while planarly moving the swivel shaft.

7. A packaging method comprising:

a first step of putting an article to be packaged on a tray having an opening in its upper face;

a second step of covering the opening in the tray with a film;

a third step of touching, in a direction intersecting with a vertical direction, a plurality of heated hot members against the film on a portion of a periphery of the opening in the tray near the opening where the film touches; and a fourth step of moving the heated hot members while the heated hot members are touching against the film on the portion of the periphery of the opening in the tray, the heated hot members being moved along the periphery of the opening in the tray by swiveling the plurality of heated hot members about axes of at least two swivel shafts disposed in different planar positions.

8. A packaging apparatus, in which a tray provided with a flange and an opening surrounded by the flange on its upper face and containing an article to be packaged, is covered with a film over the opening and the film is welded to the flange, the packaging apparatus comprising:

a support member arranged to support the tray with a portion of the flange lying in a first plane that substantially contains the film when welded to the flange;

a hot member having a face arranged and configured to touch against the film on a portion of the flange of the tray, the face being arranged to be lying in a second plane that forms an angle with respect to the first plane when touching; and moving means for moving at least one of the hot member and the tray while the hot member is touching against the film on the portion of the flange of the tray.

9. A packaging apparatus set forth in claim 8, wherein the moving means moves the hot member against the tray.

10. A packaging apparatus set forth in claim 8, wherein the moving means moves the tray against the hot member.

11. A packaging apparatus set forth in claim 8, wherein the hot member is a heat-emitting roller and rolls on the flange of the tray while the tray and the hot member are moving relative to each other.

12. A packaging apparatus set forth in claim 8, wherein the face of the hot member that touches against the film on the portion of the flange of the tray is made of an elastomer containing silicon or fluoro rubber.

13. A packaging apparatus, in which a tray provided with a flange and an opening surrounded by the flange on its upper face and containing an article to be packaged is covered with a film over the opening and the film is welded to the flange, the packaging apparatus comprising:

a hot member having a face that is capable of touching against the film on a portion of the flange of the tray, the face capable of touching the film being at an angle with respect to a horizontal plane; and moving means for moving the hot member while the hot member is touching against the film on the portion of the flange of the tray, the moving means comprising:

a swivel mechanism which swivels the hot member about a swivel shaft; and a moving swivel shaft mechanism which planarly moves the swivel shaft of the swivel mechanism.

14. A packaging apparatus set forth in claim 13, further comprising a controller that controls at least one of a speed at which the hot member is swiveled by the swivel mechanism and a speed at which the swivel shaft is moved by the moving swivel shaft mechanism.

15. A packaging apparatus, in which a tray provided with a flange and an opening surrounded by the flange on its upper face and containing an article to be packaged, is covered with a film over the opening and the film is welded to the flange, the packaging apparatus comprising:

a plurality of hot members having faces that are capable of touching against the film on a portion of the flange of the tray, the faces capable of touching the film being at an angle with respect to a horizontal plane; and moving means for moving the hot members while the hot members are touching against the film on the portion of the flange of the tray, the moving means having a swivel mechanism with at least two swivel shafts disposed in different planar positions, the swivel mechanism moving the plurality of hot members by swiveling at least one of the hot members about a first swivel shaft and swiveling at least one of the hot members about a second swivel shaft.

16. A packaging apparatus set forth in claim 15, wherein said moving means further has a moving swivel shaft mechanism which planarly moves at least one of the swivel shafts.

17. A packaging apparatus set forth in claim 16, further comprising
   a controller that controls at least one of a speed at which the hot members are swiveled by the swivel mechanism and a speed at which the swivel shaft is moved by the moving swivel shaft mechanism.

18. A packaging apparatus, in which a tray provided with a flange and an opening surrounded by the flange on its upper face and containing an article to be packaged, is covered with a film over the opening and the film is welded to the flange, the packaging apparatus comprising:
   a hot member having a face that is capable of touching against the film on a portion of the flange of the tray, the face capable of touching the film being at an angle with respect to a horizontal plane; and
   moving means for moving at least one of the hot member and the tray while the hot member is touching against the film on the portion of the flange of the tray;
   a film feeding means for feeding the film between the tray and the hot member;
   a lift mechanism which lifts the tray and presses the flange of the tray against the film; and
   a hot member moving mechanism which moves the hot member and presses it against the film at the portion of the flange of the tray, which has been lifted by the lift mechanism.

19. A packaging apparatus, in which a tray provided with a flange and an opening surrounded by the flange on its upper face and containing an article to be packaged, is covered with a film over the opening and the film is welded to the flange, the packaging apparatus comprising:
   a plurality of hot members having faces that are capable of touching against the film on a portion of the flange of the tray, the faces capable of touching the film being at an angle with respect to a horizontal plane, the hot members being so arranged that each hot member can touch the film on a different portion of the flange of the tray; and
   moving means for moving at least one of the hot members and the tray while the hot members are touching against the film on the portion of the flange of the tray.

20. A packaging apparatus, in which a tray provided with a flange and an opening surrounded by the flange on its upper face and containing an article to be packaged, is covered with a film over the opening and the film is welded to the flange, the packaging apparatus comprising:
   a hot member having a face that is capable of touching against the film on a portion of the flange of the tray, the face capable of touching the film being at an angle with respect to a horizontal plane; and
   moving means for moving at least one of the hot member and the tray while the hot member is touching against the film on the portion of the flange of the tray to form a thermally welded portion; and
   a controller that controls the moving means to move at least one of the tray and the hot member so that the film spanning the opening is thermally cut at the outside of the thermally welded portion while being thermally welded to the tray.

21. A packaging apparatus, in which a tray having on its upper face a flange and an opening that is surrounded by the flange and containing an article to be packaged is covered with a film over the opening with the film being welded to the flange, the packaging apparatus comprising:
   a support member arranged to support the tray with a portion of the flange lying in a first plane that substantially contains the film when welded to the flange;
   a hot member having a face arranged and configured to touch against the film on a portion of the flange of the tray, the face being arranged to be lying in a second plane that forms an angle with respect to the first plane when touching; and
   a hot member moving mechanism that moves the hot member along the flange while the hot member is touching against the film on the portion of flange of the tray.

\* \* \* \* \*